(12) United States Patent
Zhang

(10) Patent No.: US 10,560,904 B2
(45) Date of Patent: Feb. 11, 2020

(54) METHOD AND DEVICE IN WIRELESS TRANSMISSION

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/257,079

(22) Filed: Jan. 25, 2019

(65) Prior Publication Data
US 2019/0191390 A1 Jun. 20, 2019

Related U.S. Application Data

(63) Continuation of application No. PCT/CN2017/091923, filed on Jul. 6, 2017.

(30) Foreign Application Priority Data

Jul. 28, 2016 (CN) .......................... 2016 1 0605201

(51) Int. Cl.
H04B 7/02 (2018.01)
H04W 52/14 (2009.01)
(Continued)

(52) U.S. Cl.
CPC ............ H04W 52/325 (2013.01); H04B 7/02 (2013.01); H04L 5/00 (2013.01); H04W 28/06 (2013.01);
(Continued)

(58) Field of Classification Search
CPC . H04W 52/325; H04W 28/06; H04W 52/367; H04W 72/0413; H04W 72/0446;
(Continued)

(56) References Cited

U.S. PATENT DOCUMENTS

2015/0092655 A1* 4/2015 Liao ...................... H04J 11/005
370/312
2015/0282104 A1* 10/2015 Damnjanovic ..... H04W 52/365
455/522
(Continued)

FOREIGN PATENT DOCUMENTS

| CN | 101663852 A | 3/2010 |
| CN | 102598811 A | 7/2012 |
| CN | 104620629 A | 5/2015 |

OTHER PUBLICATIONS

Discussion on sPUSCH with TTI Shortening R1-164544, LG Electronics, 3GPP TSG RAN WGI Meeting #85, May 27, 2016, p. 1-p. 4.

(Continued)

Primary Examiner — Dong-Chang Shiue
(74) Attorney, Agent, or Firm — Maschoff Brennan

(57) ABSTRACT

The present disclosure provides a method and a device in wireless transmission. A User Equipment (UE) transmits Q piece(s) of indication information, and then transmits a first reference signal and a first radio signal on a first carrier, wherein the first radio signal includes L radio sub-signals, and the L radio sub-signals occupy L time intervals respectively. The Q piece(s) of indication information is(are) used for determining ratios of transmit powers of the first radio signal to transmit powers of the first reference signal in Q time interval(s) respectively. The Q time interval(s) is(are) one(Q ones) of the L time intervals. The present disclosure can implement dynamic regulation of transmit powers of the first radio signal in the Q time interval(s), thereby optimizing (Continued)

the transmit power of the first radio signal on the premise of ensuring physical channels carrying control information acquire sufficient transmit powers in carrier aggregation scenarios.

20 Claims, 5 Drawing Sheets

(51) Int. Cl.
| | |
|---|---|
| *H04W 52/32* | (2009.01) |
| *H04L 5/00* | (2006.01) |
| *H04W 28/06* | (2009.01) |
| *H04W 52/36* | (2009.01) |
| *H04W 72/04* | (2009.01) |
| *H04W 72/12* | (2009.01) |

(52) U.S. Cl.
CPC ....... *H04W 52/146* (2013.01); *H04W 52/367* (2013.01); *H04W 72/0413* (2013.01); *H04W 72/1268* (2013.01); *Y02D 70/00* (2018.01)

(58) Field of Classification Search
CPC .... H04W 72/042; H04W 52/146; H04B 7/02; H04L 5/00; H04L 5/0053; H04L 52/325
See application file for complete search history.

(56) References Cited

U.S. PATENT DOCUMENTS

2016/0105905 A1    4/2016   Vajapeyam et al.
2016/0143055 A1*   5/2016   Nammi ............... H04W 74/006
                                                           370/329

OTHER PUBLICATIONS

ISR received in application No. PCT/CN2017/091923 dated Sep. 28, 2017.

* cited by examiner

METHOD AND DEVICE IN WIRELESS TRANSMISSION

This application is a continuation of International Application No. PCT/CN2017/091923, filed Jul. 6, 2017, claiming the priority benefit of Chinese Patent Application Serial Number CN201610605201.3, filed on Jul. 28, 2016, the full disclosure of which is incorporated herein by reference.

BACKGROUND

Technical Field

The present disclosure relates to transmission schemes of radio signals in wireless communication systems, and in particular to a method and a device in a base station and a User Equipment (UE) supporting low-latency communication.

BACKGROUND

In present Long-term Evolution (LTE) and Long Term Evolution Advanced (LTE-A) systems, a Transmission Time Interval (TTI) or subframe or Physical Resource Block (PRB) pair corresponds to one milli-second (ms) in time. One LTE subframe includes two timeslots, which are a first timeslot and a second timeslot respectively. The first timeslot and the second timeslot occupy the former half milli-second and the latter half milli-second of one LTE subframe respectively.

In conventional LTE systems, when a Carrier Aggregation (CA) mechanism is introduced, in order to guarantee the correct reception of Uplink Control Information (UCI) at a base station side, policies are defined relevant to power scaling. Specifically, when a plurality of carriers perform transmissions simultaneously at the same time, a carrier transmitting a Physical Uplink Control Channel (PUCCH) has a higher priority in power allocation than a carrier transmitting a Physical Uplink Shared Channel (PUSCH), and a carrier transmitting a PUSCH containing a UCI has a higher priority in power allocation than a carrier transmitting a PUSCH containing no UCI.

In reduced latency technologies in the 3rd Generation Partner Project (3GPP) Release 14 and in the New Radio (NR) access technologies, one important application scenario is Ultra-Reliable and Low Latency Communications (URLLC). For the reduced latency and URLLC scenarios, a new time interval, that is, Short Transmission Time Interval (sTTI), is introduced. Correspondingly, conventional methods for power scaling need to be redesigned.

SUMMARY

Researchers find that when a plurality of carriers perform uplink transmissions using sTTIs with different durations, a data transmission of a long sTTI may correspond to a plurality of transmissions of short sTTIs. Some of the transmissions of short sTTIs are uplink control channels, some are data channels containing uplink control information, and the rest are pure uplink data channels. Moreover, these different combinations of channels may change dynamically. Therefore, the conventional power scaling approach, that is, the selection of power applied by the transmissions of long sTTIs becomes a problem.

One intuitive method is that two carriers share equally a maximum transmit power that a UE is capable of supporting. However, this method has an immediate problem that the transmit power of the uplink control channel will be reduced, thus the performance of the uplink control channel will be impacted.

In view of the above problems, the present disclosure provides a solution. It should be noted that the embodiments of the present disclosure and the characteristics in the embodiments may be mutually combined if no conflict is incurred. For example, embodiments in the UE of the present disclosure and the characteristics in the embodiments may be applied to the base station, and vice versa.

The present disclosure provides a method in a UE for low-latency communication, wherein the method includes:
  transmitting Q piece(s) of indication information; and
  transmitting a first reference signal and a first radio signal on a first carrier.

Herein, the first radio signal carries at least one of a first bit block and a first UCI; the first radio signal is transmitted by a first antenna port group; the first antenna port group includes P antenna port(s), P being a positive integer; the first reference signal includes P Reference Signal (RS) port(s), and the P RS port(s) is(are) transmitted by the P antenna port(s) respectively; the first radio signal includes L radio sub-signals, and the L radio sub-signals occupy L time intervals respectively, the L being a positive integer greater than 1; the Q piece(s) of indication information is(are) used for determining ratios of transmit powers of the first radio signal to transmit powers of the first reference signal in Q time interval(s) respectively, the Q time interval(s) is(are) one(Q ones) of the L time intervals; and the Q is a positive integer less than or equal to the L.

In one embodiment, in conventional LTE and LTE-A systems, power scaling is conducted based on each subframe, moreover, on different carriers, a UE transmits one type of physical channels in only one subframe. However, when a UE supports sTTI and CA simultaneously and when configurations of sTTIs are different on each carrier, in one subframe, the UE may transmit different uplink channels in different sTTIs, and a long sTTI on one carrier will correspond to sTTIs carrying a plurality of different physical channels on one other carrier. Therefore, the conventional power scaling approach does not apply.

In one embodiment, through the design of the Q piece(s) of indication information, the above method designed by the present disclosure can implement regulation of transmit power of the first radio signal in each time interval of the Q time interval(s), so as to adapt to the types of physical channels transmitted on one other carrier corresponding to the Q time interval(s), thereby ensuring the uplink control information to be correctly received by the base station.

In one embodiment, the L time intervals are continuous.

In one embodiment, a physical layer channel occupied by the first UCI is a physical layer control channel other than PUCCH Format 1, PUCCH Format 1a, PUCCH Format 1b and PUCCH Format 2.

In one embodiment, time domain resources occupied by the first reference signal belongs to a first time interval, and the first time interval is one of the L time intervals.

In one embodiment, the L time intervals are located in one subframe.

In one embodiment, the L time intervals are located within one milli-second.

In one embodiment, the L time intervals are located within 0.5 milli-second.

In one embodiment, at least two time intervals of the L time intervals have different durations.

In one embodiment, a Resource Unit (RU) mentioned in the paper refers to the smallest unit of resource allocation.

The RU occupies one multicarrier symbol in time domain and one subcarrier in frequency domain.

In one embodiment, the multicarrier symbol mentioned in the paper is one of an Orthogonal Frequency Division Multiplexing (OFDM) symbol including a Cyclic Prefix (CP), a Discrete Fourier Transform Spreading Orthogonal Frequency Division Multiplexing (DFT-s-OFDM) symbol including a CP, a Single-Carrier Frequency Division Multiple Access (SC-FDMA) symbol, and a Filter Bank Multi Carrier (FBMC) symbol.

In one embodiment, the ratio of the transmit power of the first radio signal to the transmit power of the first reference signal, for a given antenna port of the P antenna ports, refers to a ratio of a transmit power allocated to the first radio signal on one RU to a transmit power allocated to the first reference signal on one RU.

In one subembodiment, the ratio of the transmit power allocated to the first radio signal on one RU to the transmit power allocated to the first reference signal on one RU is the same for all antenna ports of the P antenna ports.

In one embodiment, time domain resources occupied by the first reference signal belong to a first time interval, and the first time interval is one of the L time intervals.

In one subembodiment, for any one given antenna port of the P antenna ports, the ratio of the transmit power allocated to the first radio signal on one RU to the transmit power allocated to the first reference signal on one RU in the first time interval is a determined default parameter (no explicit indication by downlink signalings or uplink signalings is needed).

In one affiliated embodiment of the above subembodiment, the determined default parameter is 1.

In one affiliated embodiment of the above subembodiment, the determined default parameter is a constant.

In one embodiment, a given radio signal carrying a given bit block refers that: the given radio signal is an output after the given bit block experiences in sequence channel coding, modulation mapper, layer mapper, precoding, resource element mapper, and generation of OFDM signals.

In one embodiment, a given radio signal carrying a given bit block refers that: the given bit block is used for generating the given radio signal.

In one embodiment, the first bit block is a Transport Block (TB).

In one embodiment, the first bit block includes two TBs.

In one embodiment, the first UCI includes at least one of a Hybrid Automatic Repeat request Acknowledgment (HARQ-ACK), Channel State Information (CSI), and a Scheduling Request (SR).

In one subembodiment, the HARQ-ACK indicates whether a related TB is correctly decoded.

In one embodiment, the first bit block and the first UCI are both transmitted on a first physical layer data channel.

In one embodiment, the first bit block is transmitted on a first physical layer data channel, and the first UCI is transmitted on a first physical layer control channel.

In one subembodiment of the above two embodiments, the first physical layer data channel is a PUSCH, and the first physical layer control channel is a PUCCH.

In one subembodiment of the above two embodiments, the first physical layer data channel is a Short TTI PUSCH (sPUSCH), and the first physical layer control channel is a Short TTI PUCCH (sPUCCH).

In one subembodiment of the above two embodiments, a sTTI corresponding to the first physical layer data channel has a duration of 0.5 ms.

In one subembodiment of the above two embodiments, the first UCI is a HARQ-ACK, and a downlink sTTI corresponding to the first UCI has a duration of 0.5 ms.

In one embodiment, channel parameters of a radio channel through which the first reference signal passes can be used for determining channel parameters of a radio channel through which the first radio signal passes.

In one subembodiment, an antenna port group used for transmitting the first reference signal is the same as the antenna port group used for transmitting the first radio signal, and the antenna port group includes one or more antenna ports.

In one subembodiment, the channel parameters include a channel impulse response.

In one subembodiment, the channel parameters include small-scale fading.

In one embodiment, the first reference signal is used for the demodulation of the first radio signal.

According to one aspect of the present disclosure, the method includes:

transmitting a second reference signal on the first carrier.

Herein, the second reference signal includes P RS port(s), time domain resources occupied by the first reference signal belong to a first time interval time domain resources occupied by the second reference signal belong to a second time interval, and the first time interval and the second time interval are two orthogonal time intervals of the L time intervals.

In one embodiment, the above method is characterized in that: the base station can perform channel estimation and demodulation using the first reference signal and the second reference signal simultaneously. The transmit power of the first radio signal can refer to the first reference signal, the transmit power of the second reference signal may be different from the transmit power of the first reference signal, and the base station knows the transmit power of the second reference signal without explicit signalings. This method facilitates the base station to perform channel estimation and demodulation using the above two reference signals simultaneously, and improves the system performance.

In one embodiment, the orthogonal refers to non-overlapping in time domain.

In one subembodiment, for any one given antenna port of the P antenna ports, the ratio of the transmit power allocated to the first radio signal on one RU to the transmit power allocated to the second reference signal on one RU in the second time interval is a determined default parameter (no explicit indication by downlink signalings or uplink signalings is needed).

In one affiliated embodiment of the above subembodiment, the determined default parameter is 1.

In one affiliated embodiment of the above subembodiment, the determined default parameter is a constant.

In one embodiment, channel parameters of a radio channel through which the second reference signal passes can be used for determining channel parameters of a radio channel through which the first radio signal passes.

In one subembodiment, an antenna port group used for transmitting the second reference signal is the same as the antenna port group used for transmitting the first radio signal, and the antenna port group includes one or more antenna ports.

In one subembodiment, the channel parameters include a channel impulse response.

In one subembodiment, the channel parameters include small-scale fading.

In one embodiment, the second reference signal is used for the demodulation of the first radio signal.

According to one aspect of the present disclosure, the method includes:

transmitting R low-latency radio signal(s) on a second carrier.

Herein, time domain resources occupied by the R low-latency radio signal(s) belong to R time interval(s) respectively, and the R time interval(s) is(are) one(R ones) of the L time intervals, the R being a positive integer, the low-latency radio signal carries at least one of a low-latency bit block and a low-latency UCI; time domain resources occupied by R radio sub-signal(s) of the L radio sub-signals belong to the R time interval(s) respectively, a transmit power of a given radio sub-signal of the R radio sub-signal(s) is a first power, a time interval occupied by the given radio sub-signal is a given time interval, and the given time interval is one of the R time interval(s); time domain resources occupied by a given low-latency radio signal of the R low-latency radio signal(s) belong to the given time interval; and a transmit power of the given low-latency radio signal is a second power.

In one embodiment, the above method is characterized in that: the UE regulates the transmit powers of the radio sub-signal and the corresponding low-latency radio signal dynamically according to the information carried by the radio sub-signal and the information carried by the low-latency radio signal, so as to guarantee the performance of uplink transmission.

In one embodiment, the R low-latency radio signal(s) include at least a first low-latency radio signal and a second low-latency radio signal, the first low-latency radio signal carries the low-latency bit block in the low-latency bit block and the low-latency UCI, and the second low-latency radio signal carries the low-latency UCI in the low-latency bit block and the low-latency UCI.

In one embodiment, the low-latency UCI includes at least one of a HARQ-ACK, a CSI and an SR.

In one embodiment, the low-latency UCI is a HARQ-ACK.

In one embodiment, the low-latency bit block is a TB.

In one embodiment, the low-latency bit block includes two TBs.

In one embodiment, for a given low-latency radio signal, the low-latency bit block and the low-latency UCI are both transmitted on a first physical layer data channel.

In one embodiment, for a given low-latency radio signal, the low-latency bit block is transmitted on a second physical layer data channel, and the low-latency UCI is transmitted on a second physical layer control channel.

In one subembodiment of the above two embodiments, the second physical layer data channel is a sPUSCH, and the second physical layer control channel is a sPUCCH.

In one subembodiment of the above two embodiments, a sTTI corresponding to the second physical layer data channel has a duration less than or equal to 0.5 ms.

In one subembodiment of the above two embodiments, a sTTI corresponding to the second physical layer control channel has a duration less than or equal to 0.5 ms.

In one embodiment, the first power and the second power are linear values respectively.

In one embodiment, the first power and the second power are in units of watts respectively.

In one embodiment, the first power and the second power are in units of milli-watts respectively.

In one embodiment, the first power and the second power are in units of dBm respectively.

According to one aspect of the present disclosure, the first radio signal carries the first bit block in the first bit block and the first UCI, and the given low-latency radio signal carries the low-latency UCI; or the first radio signal carries the first UCI, the given low-latency radio signal carries the low-latency UCI, the first UCI is transmitted on a physical layer data channel, and the low-latency UCI is transmitted on a physical layer control channel. A first ideal power is less than or equal to a total residual power minus a second power, and the first power is equal to the first ideal power, or a first ideal power is greater than a total residual power minus a second power, and the first power is less than or equal to the total residual power minus the second power. The second power is a transmit power of the given low-latency radio signal when the power is not scaled, and the first ideal power is a transmit power of the given radio sub-signal when the power is not scaled. The total residual power refers to a maximum total transmit power minus a total allocated power, and the total allocated power refers to a total transmit power of the UE on other carriers than the first carrier and the second carrier in the given time interval.

In one embodiment, the above method is characterized in that: the priority of the first radio signal is lower than the priority of the given low-latency radio signal, and transmit power is allocated preferentially to the low-latency radio signal so as to guarantee the reception performance of the low-latency radio signal.

In one embodiment, a physical layer channel corresponding to the first radio signal is a PUSCH or sPUSCH carrying no UCI, and a physical layer channel corresponding to the low-latency radio signal is a PUSCH or sPUSCH carrying a UCI.

In one embodiment, a physical layer channel corresponding to the first radio signal is a PUSCH or sPUSCH carrying no UCI, and a physical layer channel corresponding to the low-latency radio signal is a PUCCH or sPUCCH.

In one embodiment, a physical layer channel corresponding to the first radio signal is a PUSCH or sPUSCH carrying a UCI, and a physical layer channel corresponding to the low-latency radio signal is a PUCCH or sPUCCH.

In one embodiment, a given radio signal carrying given first information refers that: the given first information is used for generating the given radio signal.

In one subembodiment, target information is also used for generating the given radio signal, wherein the target information is information other than the given first information.

In one embodiment, a given radio signal carrying given first information refers that: the given radio signal carries at least the given first information.

In one embodiment, a given radio signal carrying given first information in the given first information and given second information refers that: the given radio signal carries the given first information, but the given radio signal does not carry the given second information.

In one embodiment, the UE transmits radio signals only on the first carrier and the second carrier in the given time interval, and the total residual power is the maximum total transmit power.

In one embodiment, the first ideal power is fixed.

In one embodiment, the generation mode for the first ideal power is predefined.

In one embodiment, the first ideal power is configurable.

In one embodiment, the first ideal power is related to at least one of a position of the given time interval in a given subframe and a position of the given subframe in a given radio frame, wherein the given subframe is a subframe that the given time interval occupies, and the given radio frame is a radio frame that the given subframe occupies.

In one embodiment, the first ideal power is related to the type of a physical layer channel corresponding to the first radio signal.

In one embodiment, the first power is $P_1(j)$, the first ideal power is $P_1^{Ideal}$, the total residual power is $P_{RE}(j)$, the second power is $P_2(j)$, the $P_1^{Ideal}$ is less than or equal to $(P_{RE}(j)-P_2(j))$, and the $P_1(j)$ meets the following formula:

$$P_1(j) = P_1^{Ideal}$$

In one subembodiment, the j represents a position sequence number of the given time interval in a given subframe, and the given subframe is a subframe that the given time interval occupies.

In one subembodiment, the $P_{RE}(j)$ meets the following formula:

$$P_{RE}(j) = P_{TMAX} - \sum_{C_n \neq C_1, C_n \neq C_2}^{C_M} P_{C_n}(j)$$

where the $P_{TMAX}$ is a maximum power of the uplink transmission of the UE, and the $P_{C_n}(j)$ is a transmit power of the carrier $C_n$ in the given time interval. The $$\sum_{C_n \neq C_1, C_n \neq C_2}^{C_M} P_{C_n}(j)$$

corresponds to the total allocated power, the carrier $C_1$ corresponds to the first carrier, the carrier $C_2$ corresponds to the second carrier, and the carrier set $C_M$ corresponds to all carriers on which the UE performs uplink transmissions simultaneously in the time interval. The carrier $C_n$ is a carrier other than the first carrier and the second carrier.

In one affiliated embodiment of the above subembodiment, what transmitted on the carrier $C_n$ in the given time interval is a PUCCH or sPUCCH.

In one affiliated embodiment of the above subembodiment, what transmitted on the carrier $C_n$ in the given time interval is a PUSCH or sPUSCH carrying a UCI, and a physical layer channel corresponding to the first radio signal is a PUSCH or sPUSCH carrying no UCI.

In one affiliated embodiment of the above subembodiment, what transmitted on the carrier $C_n$ in the given time interval is a PUSCH or sPUSCH carrying no UCI, and a physical layer channel corresponding to the first radio signal is a PUSCH or sPUSCH carrying no UCI.

In one embodiment, the first power is $P_1(j)$ the first ideal power is $P_1^{Ideal}$, the total residual power is $P_{RE}(j)$, the second power is $P_2(j)$, the $P_1^{Ideal}$ is greater than $(P_{RE}(j)-P_2(j))$, and the $P_1(j)$ meets the following formula:

$$P_1(j) = w \cdot P_1^{Ideal} \text{ and } w \cdot P_1^{Ideal} \leq P_{RE}(j).$$

In one subembodiment, the j represents a position sequence number of the given time interval in a given subframe, and the given subframe is a subframe that the given time interval occupies.

In one subembodiment, the $P_{RE}(j)$ meets the following formula:

$$P_{RE}(j) = P_{TMAX} - \sum_{C_n \neq C_1, C_n \neq C_2}^{C_M} P_{C_n}(j)$$

where the $P_{TMAX}$ is a maximum power of the uplink transmission of the UE, and the $P_{C_n}(j)$ is a transmit power of the carrier $C_n$ in the given time interval. The $$\sum_{C_n \neq C_1, C_n \neq C_2}^{C_M} P_{C_n}(j)$$

corresponds to the total allocated power, the carrier $C_1$ corresponds to the first carrier, the carrier $C_2$ corresponds to the second carrier, and the carrier set $C_M$ corresponds to all carriers on which the UE performs uplink transmissions simultaneously in the time interval. The carrier $C_n$ is a carrier other than the first carrier and the second carrier.

In one affiliated embodiment of the above subembodiment, what transmitted on the carrier $C_n$ in the given time interval is a PUCCH or sPUCCH.

In one affiliated embodiment of the above subembodiment, what transmitted on the carrier $C_n$ in the given time interval is a PUSCH or sPUSCH carrying a UCI, and a physical layer channel corresponding to the first radio signal is a PUSCH or sPUSCH carrying no UCI.

In one affiliated embodiment of the above subembodiment, what transmitted on the carrier $C_n$ in the given time interval is a PUSCH or sPUSCH carrying no UCI, and a physical layer channel corresponding to the first radio signal is a PUSCH or sPUSCH carrying no UCI.

According to one aspect of the present disclosure, the first radio signal carries the first UCI, and the given low-latency radio signal carries the low-latency bit block in the low-latency bit block and the low-latency UCI; or the first radio signal carries the first UCI, the given low-latency radio signal carries the low-latency UCI, the first UCI is transmitted on a physical layer control channel, and the low-latency UCI is transmitted on a physical layer data channel. A second ideal power is less than or equal to a total residual power minus a first power, and the second power is equal to the second ideal power, or a second ideal power is greater than a total residual power minus a first power, and the second power is less than or equal to the total residual power minus the first power. The first power is a transmit power of the given radio sub-signal when the power is not scaled, and the second ideal power is a transmit power of the given low-latency radio signal when the power is not scaled. The total residual power refers to a maximum total transmit power minus a total allocated power, and the total allocated power refers to a total transmit power of the UE on other carriers than the first carrier and the second carrier in the given time interval.

In one embodiment, the above method is characterized in that: the priority of the first radio signal is higher than the priority of the low-latency radio signal, and transmit power is allocated preferentially to the first radio signal so as to guarantee the reception performance of the first radio signal.

In one embodiment, a physical layer channel corresponding to the first radio signal is a PUSCH or sPUSCH carrying a UCI, and a physical layer channel corresponding to the low-latency radio signal is a PUSCH or sPUSCH carrying no UCI.

In one embodiment, a physical layer channel corresponding to the first radio signal is a PUCCH or sPUCCH, and a physical layer channel corresponding to the low-latency radio signal is a PUSCH or sPUSCH carrying a UCI.

In one embodiment, a physical layer channel corresponding to the first radio signal is a PUCCH or sPUCCH, and a physical layer channel corresponding to the low-latency radio signal is a PUSCH or sPUSCH carrying no UCI.

In one embodiment, the second ideal power is fixed.

In one embodiment, the generation mode for the second ideal power is predefined.

In one embodiment, the second ideal power is configurable.

In one embodiment, the second ideal power is related to at least one of a position of the given time interval in a given subframe and a position of the given subframe in a given radio frame, wherein the given subframe is a subframe that the given time interval occupies, and the given radio frame is a radio frame that the given subframe occupies.

In one embodiment, the second ideal power is related to the type of a physical layer channel corresponding to the given low-latency radio signal.

In one embodiment, the first power is $P_1(j)$, the second ideal power is $P_2^{Ideal}$, the total residual power is $P_{RE}(j)$, the second power is $P_2(j)$, the $P_2^{Ideal}$ is less than or equal to $(P_{RE}(j)-P_1(j))$, and the $P_2(j)$ meets the following formula:

$$P_2(j)=P_2^{Ideal}$$

In one subembodiment, the j represents a position sequence number of the given time interval in a given subframe, and the given subframe is a subframe that the given time interval occupies.

In one subembodiment, the $P_{RE}(j)$ meets the following formula:

$$P_{RE}(j) = P_{TMAX} - \sum_{C_n \neq C_1, C_n \neq C_2}^{C_M} P_{C_n}(j)$$

where the $P_{TMAX}$ is a maximum power of the uplink transmission of the UE, and the $P_{C_n}(j)$ is a transmit power of the carrier $C_n$ in the given time interval. The $$\sum_{C_n \neq C_1, C_n \neq C_2}^{C_M} P_{C_n}(j)$$

corresponds to the total allocated power, the carrier $C_1$ corresponds to the first carrier, the carrier $C_2$ corresponds to the second carrier, and the carrier set $C_M$ corresponds to all carriers on which the UE performs uplink transmissions simultaneously in the time interval. The carrier $C_n$ is a carrier other than the first carrier and the second carrier.

In one affiliated embodiment of the above subembodiment, what transmitted on the carrier $C_n$ in the given time interval is a PUCCH or sPUCCH.

In one affiliated embodiment of the above subembodiment, what transmitted on the carrier $C_n$ in the given time interval is a PUSCH or sPUSCH carrying a UCI, and a physical layer channel corresponding to the low-latency radio signal is a PUSCH or sPUSCH carrying no UCI.

In one affiliated embodiment of the above subembodiment, what transmitted on the carrier $C_n$ in the given time interval is a PUSCH or sPUSCH carrying no UCI, and a physical layer channel corresponding to the low-latency radio signal is a PUSCH or sPUSCH carrying no UCI.

In one embodiment, the first power is $P_1(j)$, the second ideal power is $P_2^{Ideal}$, the total residual power is $P_{RE}(j)$, the second power is $P_2(j)$, the $P_2^{Ideal}$ is greater than $(P_{RE}(j)-P_1(j))$, and the $P_2(j)$ meets the following formula:

$$P_2(j)=w \cdot P_2^{Ideal} \text{ and } w \cdot P_2^{Ideal} \leq P_{RE}(j).$$

where w is a scaling factor, which is a real number not less than 0 but less than or equal to 1.

In one subembodiment, the j represents a position sequence number of the given time interval in a given subframe, and the given subframe is a subframe that the given time interval occupies.

In one subembodiment, the $P_{RE}(j)$ meets the following formula:

$$P_{RE}(j) = P_{TMAX} - \sum_{C_n \neq C_1, C_n \neq C_2}^{C_M} P_{C_n}(j)$$

where the $P_{TMAX}$ is a maximum power of the uplink transmission of the UE, and the $P_{C_n}(j)$ is a transmit power of the carrier $C_n$ in the given time interval. The $$\sum_{C_n \neq C_1, C_n \neq C_2}^{C_M} P_{C_n}(j)$$

corresponds to the total allocated power, the carrier $C_1$ corresponds to the first carrier, the carrier $C_2$ corresponds to the second carrier, and the carrier set $C_M$ corresponds to all carriers on which the UE performs uplink transmissions simultaneously in the time interval. The carrier $C_n$ is a carrier other than the first carrier and the second carrier.

In one affiliated embodiment of the above subembodiment, what transmitted on the carrier $C_n$ in the given time interval is a PUCCH or sPUCCH.

In one affiliated embodiment of the above subembodiment, what transmitted on the carrier $C_n$ in the given time interval is a PUSCH or sPUSCH carrying a UCI, and a physical layer channel corresponding to the low-latency radio signal is a PUSCH or sPUSCH carrying no UCI.

In one affiliated embodiment of the above subembodiment, what transmitted on the carrier $C_n$ in the given time interval is a PUSCH or sPUSCH carrying no UCI, and a physical layer channel corresponding to the low-latency radio signal is a PUSCH or sPUSCH carrying no UCI.

According to one aspect of the present disclosure, the first radio signal carries the first bit block in the first bit block and the first UCI, and the given low-latency radio signal carries the low-latency bit block in the low-latency bit block and the low-latency UCI; or the first radio signal carries the first UCI, the given low-latency radio signal carries the low-latency UCI, the first UCI is transmitted on a physical layer control channel, and the low-latency UCI is transmitted on a physical layer control channel; or the first radio signal carries the first UCI, the given low-latency radio signal carries the low-latency UCI, the first UCI is transmitted on a physical layer data channel, and the low-latency UCI is transmitted on a physical layer data channel. A sum of a first ideal power and a second ideal power is less than or equal to a total residual power, the first power is equal to the first ideal power, and the second power is equal to the second ideal power, or a sum of a first ideal power and a second ideal power is greater than a total residual power, the first power is equal to a product of the first ideal power and a scaling factor, and the second power is equal to a product of the second ideal power and the scaling factor. The first ideal power is a transmit power of the given radio sub-signal when the power is not scaled, and the second ideal power is a transmit power of the given low-latency radio signal when the power is not scaled. The scaling factor is not less than 0 but less than or equal to 1.

In one embodiment, the above method is characterized in that: the priority of the first radio signal is equal to the priority of the low-latency radio signal; the first radio signal and the low-latency radio signal share the transmit power so as to guarantee the performance of reception of the two signals.

In one embodiment, a physical layer channel corresponding to the first radio signal is a PUSCH or sPUSCH carrying no UCI, and a physical layer channel corresponding to the low-latency radio signal is a PUSCH or sPUSCH carrying no UCI.

In one embodiment, a physical layer channel corresponding to the first radio signal is a PUSCH or sPUSCH carrying a UCI, and a physical layer channel corresponding to the low-latency radio signal is a PUSCH or sPUSCH carrying a UCI.

In one embodiment, a physical layer channel corresponding to the first radio signal is a PUCCH or sPUCCH, and a physical layer channel corresponding to the low-latency radio signal is a PUCCH or sPUCCH.

In one embodiment, the first radio signal carries the first UCI, and the scaling factor corresponding to the first ideal power is equal to 1.

In one embodiment, the low-latency radio signal carries the low-latency UCI, and the scaling factor corresponding to the second ideal power is equal to 1.

In one embodiment, the first radio signal carries the first bit block in the first bit block and the first UCI, and the scaling factor corresponding to the first ideal power is less than 1.

In one embodiment, the low-latency radio signal carries the low-latency bit block in the low-latency bit block and the low-latency UCI, and the scaling factor corresponding to the second ideal power is less than 1.

In one embodiment, the first power is $P_1(j)$ the first ideal power is $P_1^{Ideal}$, the second power is $P_2(j)$, the second ideal power is $P_2^{Ideal}$, the total residual power is $P_{RE}(j)$, a sum of $P_1^{Ideal}$ and $P_2^{Ideal}$ is less than or equal to $P_{RE}(j)$, the $P_1(j)$ and the $P_2(j)$ meet the following formula:

$$P_1(j)=P_1^{Ideal}$$

$$P_2(j)=P_2^{Ideal}$$

In one subembodiment, the j represents a position sequence number of the given time interval in a given subframe, and the given subframe is a subframe that the given time interval occupies.

In one subembodiment, the $P_{RE}(j)$ meets the following formula:

$$P_{RE}(j) = P_{TMAX} - \sum_{C_n \neq C_1, C_n \neq C_2}^{C_M} P_{C_n}(j)$$

where the $P_{TMAX}$ is a maximum power of the uplink transmission of the UE, and the $P_{C_n}(j)$ is a transmit power of the carrier $C_n$ in the given time interval. The $$\sum_{C_n \neq C_1, C_n \neq C_2}^{C_M} P_{C_n}(j)$$

corresponds to the total allocated power, the carrier $C_1$ corresponds to the first carrier, the carrier $C_2$ corresponds to the second carrier, and the carrier set $C_M$ corresponds to all carriers on which the UE performs uplink transmissions simultaneously in the time interval. The carrier $C_n$ is a carrier other than the first carrier and the second carrier.

In one affiliated embodiment of the above subembodiment, what transmitted on the carrier $C_n$ in the given time interval is a PUCCH or sPUCCH.

In one affiliated embodiment of the above subembodiment, what transmitted on the carrier $C_n$ in the given time interval is a PUSCH or sPUSCH carrying a UCI, and respective physical layer channels corresponding to the first radio signal and the low-latency radio signal are PUSCHs or sPUSCHs carrying no UCI.

In one affiliated embodiment of the above subembodiment, what transmitted on the carrier $C_n$ in the given time interval is a PUSCH or sPUSCH carrying no UCI, and respective physical layer channels corresponding to the first radio signal and the low-latency radio signal are PUSCHs or sPUSCHs carrying no UCI.

In one embodiment, the first power is $P_1(j)$, the first ideal power is $P_1^{Ideal}$, the second power is $P_2(j)$, the second ideal power is $P_2^{Ideal}$, the total residual power is $P_{RE}(j)$, a sum of $P_1^{Ideal}$ and $P_2^{Ideal}$ is greater than $P_{RE}(j)$, the $P_1(j)$ and the $P_2(j)$ meet the following formula:

$$P_1(j)=w_1 \cdot P_1^{Ideal}$$

$$P_2(j)=w_2 \cdot P_2^{Ideal} \text{ and } w_1 \cdot P_1^{Ideal}+w_2 \cdot P_2^{Ideal} \leq P_{RE}(j)$$

where $w_1$ is a scaling factor corresponding to the first ideal power, $w_2$ is a scaling factor corresponding to the second ideal power, both $w_1$ and $w_2$ are real numbers not less than 0 but less than or equal to 1.

In one subembodiment, the j represents a position sequence number of the given time interval in a given subframe, and the given subframe is a subframe that the given time interval occupies.

In one subembodiment, the $P_{RE}(j)$ meets the following formula:

$$P_{RE}(j) = P_{TMAX} - \sum_{C_n \neq C_1, C_n \neq C_2}^{C_M} P_{C_n}(j)$$

where the $P_{TMAX}$ is a maximum power of the uplink transmission of the UE, and the $P_{C_n}(j)$ is a transmit power of the carrier $C_n$ in the given time interval. The $$\sum_{C_n \neq C_1, C_n \neq C_2}^{C_M} P_{C_n}(j)$$

corresponds to the total allocated power, the carrier $C_1$ corresponds to the first carrier, the carrier $C_2$ corresponds to the second carrier, and the carrier set $C_M$ corresponds to all carriers on which the UE performs uplink transmissions simultaneously in the time interval. The carrier $C_n$ is a carrier other than the first carrier and the second carrier.

In one affiliated embodiment of the above subembodiment, what transmitted on the carrier $C_n$ in the given time interval is a PUCCH or sPUCCH.

In one affiliated embodiment of the above subembodiment, what transmitted on the carrier $C_n$ in the given time interval is a PUSCH or sPUSCH carrying a UCI, and respective physical layer channels corresponding to the first radio signal and the low-latency radio signal are PUSCHs or sPUSCHs carrying no UCI.

In one affiliated embodiment of the above subembodiment, what transmitted on the carrier $C_n$ in the given time interval is a PUSCH or sPUSCH carrying no UCI, and respective physical layer channels corresponding to the first radio signal and the low-latency radio signal are PUSCHs or sPUSCHs carrying no UCI.

According to one aspect of the present disclosure, the Q piece(s) of indication information is(are) all transmitted on the first carrier, and the Q piece(s) of indication information is(are) transmitted in the Q time interval(s) respectively.

In one embodiment, the first radio signal avoids occupying time-frequency resources occupied by the Q piece(s) of indication information, by a method of puncturing.

In one embodiment, the first radio signal avoids occupying time-frequency resources occupied by the Q piece(s) of indication information, by a method of rate matching.

According to one aspect of the present disclosure, the method includes:
receiving a second signaling.

Herein, the second signaling is used for determining at least one of the Q time interval(s) and time-frequency resources occupied by the indication information in corresponding time intervals.

The present disclosure provides a method in a base station for low-latency communication, wherein the method includes:
receiving Q piece(s) of indication information; and
receiving a first reference signal and a first radio signal on a first carrier.

Herein, the first radio signal carries at least one of a first bit block and a first UCI; the first radio signal is transmitted by a first antenna port group; the first antenna port group includes P antenna port(s), P being a positive integer, the first reference signal includes P RS port(s), and the P RS port(s) is(are) transmitted by the P antenna port(s) respectively; the first radio signal includes L radio sub-signals, and the L radio sub-signals occupy L time intervals respectively, the L being a positive integer greater than 1; the Q piece(s) of indication information is(are) used for determining ratios of transmit powers of the first radio signal to transmit powers of the first reference signal in Q time interval(s) respectively; the Q time interval(s) is(are) one(Q ones) of the L time intervals; and the Q is a positive integer less than or equal to the L.

According to one aspect of the present disclosure, the method includes:
receiving a second reference signal on the first carrier.

Herein, the second reference signal includes P RS port(s), time domain resources occupied by the first reference signal belong to a first time interval, time domain resources occupied by the second reference signal belong to a second time interval, and the first time interval and the second time interval are two orthogonal time intervals of the L time intervals.

According to one aspect of the present disclosure, the method includes:
receiving R low-latency radio signal(s) on a second carrier.

Herein, time domain resources occupied by the R low-latency radio signal(s) belong to R time interval(s) respectively, and the R time interval(s) is(are) one(R ones) of the L time intervals, the R being a positive integer, the low-latency radio signal carries at least one of a low-latency bit block and a low-latency UCI; time domain resources occupied by R radio sub-signal(s) of the L radio sub-signals belong to the R time interval(s) respectively; a transmit power of a given radio sub-signal of the R radio sub-signal(s) is a first power, a time interval occupied by the given radio sub-signal is a given time interval, and the given time interval is one of the R time interval(s); time domain resources occupied by a given low-latency radio signal of the R low-latency radio signal(s) belong to the given time interval; and a transmit power of the given low-latency radio signal is a second power.

According to one aspect of the present disclosure, the first radio signal carries the first bit block in the first bit block and the first UCI, and the given low-latency radio signal carries the low-latency UCI; or the first radio signal carries the first UCI, the given low-latency radio signal carries the low-latency UCI, the first UCI is transmitted on a physical layer data channel, and the low-latency UCI is transmitted on a physical layer control channel; a first ideal power is less than or equal to a total residual power minus a second power, and the first power is equal to the first ideal power, or a first ideal power is greater than a total residual power minus a second power, and the first power is less than or equal to the total residual power minus the second power, the second power is a transmit power of the given low-latency radio signal when the power is not scaled, and the first ideal power is a transmit power of the given radio sub-signal when the power is not scaled; the total residual power refers to a maximum total transmit power minus a total allocated power, and the total allocated power refers to a total transmit power of the UE on other carriers than the first carrier and the second carrier in the given time interval.

According to one aspect of the present disclosure, the first radio signal carries the first UCI, and the given low-latency radio signal carries the low-latency bit block in the low-latency bit block and the low-latency UCI; or the first radio signal carries the first UCI, the given low-latency radio signal carries the low-latency UCI, the first UCI is transmitted on a physical layer control channel, and the low-latency UCI is transmitted on a physical layer data channel; a second ideal power is less than or equal to a total residual power minus a first power, and the second power is equal to the second ideal power; or a second ideal power is greater than a total residual power minus a first power, and the second power is less than or equal to the total residual power minus the first power, the first power is a transmit power of the given radio sub-signal when the power is not scaled, and the second ideal power is a transmit power of the given low-latency radio signal when the power is not scaled; the total residual power refers to a maximum total transmit power minus a total allocated power, and the total allocated power refers to a total transmit power of the UE on other carriers than the first carrier and the second carrier in the given time interval.

According to one aspect of the present disclosure, the first radio signal carries the first bit block in the first bit block and the first UCI, and the given low-latency radio signal carries the low-latency bit block in the low-latency bit block and the low-latency UCI; or the first radio signal carries the first UCI, the given low-latency radio signal carries the low-latency UCI, the first UCI is transmitted on a physical layer control channel, and the low-latency UCI is transmitted on a physical layer control channel; or the first radio signal carries the first UCI, the given low-latency radio signal carries the low-latency UCI, the first UCI is transmitted on a physical layer data channel, and the low-latency UCI is transmitted on a physical layer data channel; a sum of a first ideal power and a second ideal power is less than or equal to a total residual power, the first power is equal to the first ideal power, and the second power is equal to the second ideal power, or a sum of a first ideal power and a second ideal power is greater than a total residual power, the first power is equal to a product of the first ideal power and a scaling factor, and the second power is equal to a product of the second ideal power and the scaling factor, the first ideal power is a transmit power of the given radio sub-signal when the power is not scaled, and the second ideal power is a transmit power of the given low-latency radio signal when the power is not scaled; and the scaling factor is not less than 0 but less than or equal to 1.

According to one aspect of the present disclosure, the method includes:

transmitting a second signaling.

Herein, the second signaling is used for determining at least one of the Q time interval(s) and time-frequency resources occupied by the indication information in corresponding time intervals.

The present disclosure provides a UE for low-latency communication, wherein the UE includes:

a first transceiver, to transmit Q piece(s) of indication information;

a first transmitter, to transmit a first reference signal and a first radio signal on a first carrier, and a second transmitter, to transmit R low-latency radio signal(s) on a second carrier.

Herein, the first radio signal carries at least one of a first bit block and a first UCI; the first radio signal is transmitted by a first antenna port group; the first antenna port group includes P antenna port(s), P being a positive integer, the first reference signal includes P RS port(s), and the P RS port(s) is(are) transmitted by the P antenna port(s) respectively; the first radio signal includes L radio sub-signals, and the L radio sub-signals occupy L time intervals respectively, the L being a positive integer greater than 1; the Q piece(s) of indication information is(are) used for determining ratios of transmit powers of the first radio signal to transmit powers of the first reference signal in Q time interval(s) respectively; the Q time interval(s) is(are) one(Q ones) of the L time intervals; the Q is a positive integer less than or equal to the L; time domain resources occupied by the R low-latency radio signal(s) belong to R time interval(s) respectively, and the R time interval(s) is(are) one(R ones) of the L time intervals, the R being a positive integer, the low-latency radio signal carries at least one of a low-latency bit block and a low-latency UCI; time domain resources occupied by R radio sub-signal(s) of the L radio sub-signals belong to the R time interval(s) respectively; a transmit power of a given radio sub-signal of the R radio sub-signal(s) is a first power, a time interval occupied by the given radio sub-signal is a given time interval, and the given time interval is one of the R time interval(s); time domain resources occupied by a given low-latency radio signal of the R low-latency radio signal(s) belong to the given time interval; and a transmit power of the given low-latency radio signal is a second power.

In one embodiment, the first processing module further receives a second signaling; and the second signaling is used for determining at least one of the Q time interval(s) and time-frequency resources occupied by the indication information in corresponding time intervals.

In one embodiment, the first transmitting module further transmits a second reference signal on the first carrier. The second reference signal includes P RS port(s), time domain resources occupied by the first reference signal belong to a first time interval, time domain resources occupied by the second reference signal belong to a second time interval, and the first time interval and the second time interval are two orthogonal time intervals of the L time intervals.

According to one aspect of the present disclosure, the first radio signal carries the first bit block in the first bit block and the first UCI, and the given low-latency radio signal carries the low-latency UCI; or the first radio signal carries the first UCI, the given low-latency radio signal carries the low-latency UCI, the first UCI is transmitted on a physical layer data channel, and the low-latency UCI is transmitted on a physical layer control channel; a first ideal power is less than or equal to a total residual power minus a second power, and the first power is equal to the first ideal power, or a first ideal power is greater than a total residual power minus a second power, and the first power is less than or equal to the total residual power minus the second power, the second power is a transmit power of the given low-latency radio signal when the power is not scaled, and the first ideal power is a transmit power of the given radio sub-signal when the power is not scaled; the total residual power refers to a maximum total transmit power minus a total allocated power, and the total allocated power refers to a total transmit power of the UE on other carriers than the first carrier and the second carrier in the given time interval.

According to one aspect of the present disclosure, the first radio signal carries the first UCI, and the given low-latency radio signal carries the low-latency bit block in the low-latency bit block and the low-latency UCI; or the first radio signal carries the first UCI, the given low-latency radio signal carries the low-latency UCI, the first UCI is transmitted on a physical layer control channel, and the low-latency UCI is transmitted on a physical layer data channel; a second ideal power is less than or equal to a total residual power minus a first power, and the second power is equal to the second ideal power, or a second ideal power is greater than a total residual power minus a first power, and the second power is less than or equal to the total residual power minus the first power, the first power is a transmit power of the given radio sub-signal when the power is not scaled, and the second ideal power is a transmit power of the given low-latency radio signal when the power is not scaled; the total residual power refers to a maximum total transmit power minus a total allocated power, and the total allocated power refers to a total transmit power of the UE on other carriers than the first carrier and the second carrier in the given time interval.

According to one aspect of the present disclosure, the first radio signal carries the first bit block in the first bit block and the first UCI, and the given low-latency radio signal carries the low-latency bit block in the low-latency bit block and the low-latency UCI; or the first radio signal carries the first UCI, the given low-latency radio signal carries the low-latency UCI, the first UCI is transmitted on a physical layer control channel, and the low-latency UCI is transmitted on a physical layer control channel; or the first radio signal carries the first UCI, the given low-latency radio signal carries the low-latency UCI, the first UCI is transmitted on a physical layer data channel, and the low-latency UCI is transmitted on a physical layer data channel; a sum of a first ideal power and a second ideal power is less than or equal to a total residual power, the first power is equal to the first ideal power, and the second power is equal to the second ideal power, or a sum of a first ideal power and a second ideal power is greater than a total residual power, the first power is equal to a product of the first ideal power and a scaling factor, and the second power is equal to a product of the second ideal power and the scaling factor, the first ideal power is a transmit power of the given radio sub-signal when the power is not scaled, and the second ideal power is a transmit power of the given low-latency radio signal when the power is not scaled; and the scaling factor is not less than 0 but less than or equal to 1.

The present disclosure provides a base station for low-latency communication, wherein the base station includes:

a second transceiver, to receive Q piece(s) of indication information;

a first receiver, to receive a first reference signal and a first radio signal on a first carrier, and a second receiver, to receive R low-latency radio signal(s) on a second carrier.

Herein, the first radio signal carries at least one of a first bit block and a first UCI; the first radio signal is transmitted by a first antenna port group; the first antenna port group includes P antenna port(s), P being a positive integer, the first reference signal includes P RS port(s), and the P RS port(s) is(are) transmitted by the P antenna port(s) respectively; the first radio signal includes L radio sub-signals, and the L radio sub-signals occupy L time intervals respectively the L being a positive integer greater than 1; the Q piece(s) of indication information is(are) used for determining ratios of transmit powers of the first radio signal to transmit powers of the first reference signal in Q time interval(s) respectively; the Q time interval(s) is(are) one(Q ones) of the L time intervals; the Q is a positive integer less than or equal to the L; time domain resources occupied by the R low-latency radio signal(s) belong to R time interval(s) respectively, and the R time interval(s) is(are) one(R ones) of the L time intervals, the R being a positive integer. The low-latency radio signal carries at least one of a low-latency bit block and a low-latency UCI; time domain resources occupied by R radio sub-signal(s) of the L radio sub-signals belong to the R time interval(s) respectively, a transmit power of a given radio sub-signal of the R radio sub-signal(s) is a first power, a time interval occupied by the given radio sub-signal is a given time interval, and the given time interval is one of the R time interval(s); time domain resources occupied by a given low-latency radio signal of the R low-latency radio signal(s) belong to the given time interval; and a transmit power of the given low-latency radio signal is a second power.

In one embodiment, the second transceiver further transmits a second signaling, and the second signaling is used for determining at least one of the Q time interval(s) and time-frequency resources occupied by the indication information in corresponding time intervals.

In one embodiment, the first receiver further receives a second reference signal on the first carrier, and the second reference signal includes P RS port(s), time domain resources occupied by the first reference signal belong to a first time interval, time domain resources occupied by the second reference signal belong to a second time interval, and the first time interval and the second time interval are two orthogonal time intervals of the L time intervals.

According to one aspect of the present disclosure, the first radio signal carries the first bit block in the first bit block and the first UCI, and the given low-latency radio signal carries the low-latency UCI; or the first radio signal carries the first UCI, the given low-latency radio signal carries the low-latency UCI, the first UCI is transmitted on a physical layer data channel, and the low-latency UCI is transmitted on a physical layer control channel; a first ideal power is less than or equal to a total residual power minus a second power, and the first power is equal to the first ideal power, or a first ideal power is greater than a total residual power minus a second power, and the first power is less than or equal to the total residual power minus the second power, the second power is a transmit power of the given low-latency radio signal when the power is not scaled, and the first ideal power is a transmit power of the given radio sub-signal when the power is not scaled; the total residual power refers to a maximum total transmit power minus a total allocated power, and the total allocated power refers to a total transmit power of the UE on other carriers than the first carrier and the second carrier in the given time interval.

According to one aspect of the present disclosure, the first radio signal carries the first UCI, and the given low-latency radio signal carries the low-latency bit block in the low-latency bit block and the low-latency UCI; or the first radio signal carries the first UCI, the given low-latency radio signal carries the low-latency UCI, the first UCI is transmitted on a physical layer control channel, and the low-latency UCI is transmitted on a physical layer data channel; a second ideal power is less than or equal to a total residual power minus a first power, and the second power is equal to the second ideal power, or a second ideal power is greater than a total residual power minus a first power, and the second power is less than or equal to the total residual power minus the first power, the first power is a transmit power of the given radio sub-signal when the power is not scaled, and the second ideal power is a transmit power of the given low-latency radio signal when the power is not scaled; the total residual power refers to a maximum total transmit power minus a total allocated power, and the total allocated power refers to a total transmit power of the UE on other carriers than the first carrier and the second carrier in the given time interval.

According to one aspect of the present disclosure, the first radio signal carries the first bit block in the first bit block and the first UCI, and the given low-latency radio signal carries the low-latency bit block in the low-latency bit block and the low-latency UCI; or the first radio signal carries the first UCI, the given low-latency radio signal carries the low-latency UCI, the first UCI is transmitted on a physical layer control channel, and the low-latency UCI is transmitted on a physical layer control channel; or the first radio signal carries the first UCI, the given low-latency radio signal carries the low-latency UCI the first UCI is transmitted on a physical layer data channel, and the low-latency UCI is transmitted on a physical layer data channel; a sum of a first ideal power and a second ideal power is less than or equal to a total residual power, the first power is equal to the first ideal power, and the second power is equal to the second ideal power, or a sum of a first ideal power and a second ideal power is greater than a total residual power, the first power is equal to a product of the first ideal power and a scaling factor, and the second power is equal to a product of the second ideal power and the scaling factor, the first ideal power is a transmit power of the given radio sub-signal when the power is not scaled, and the second ideal power is a transmit power of the given low-latency radio signal when the power is not scaled; and the scaling factor is not less than 0 but less than or equal to 1.

In one embodiment, compared with current disclosed technologies, the present disclosure has the following benefits.

Through the design of the Q piece(s) of indication information, dynamic regulation can be implemented on transmit powers of the first radio signal transmitted in the Q time interval(s).

Through a comparison of the information carried by the first radio signal and the given low-latency radio signal and a comparison of the types of the physical layer channels corresponding to the first radio signal and the given low-latency radio signal, transmit power is allocated preferentially to the control information which needs more guarantee in transmission performance, so as to improve the performance of uplink transmission.

Through the design of the second signaling, the Q time interval(s) and the time-frequency resources occupied by the indication information in corresponding time intervals are configured and determined, so as to implement the above method of flexible allocation of transmit power.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments in the present disclosure and the characteristics of the embodiments may be arbitrarily combined if no conflict is caused.

Embodiment 1

Figure 1:
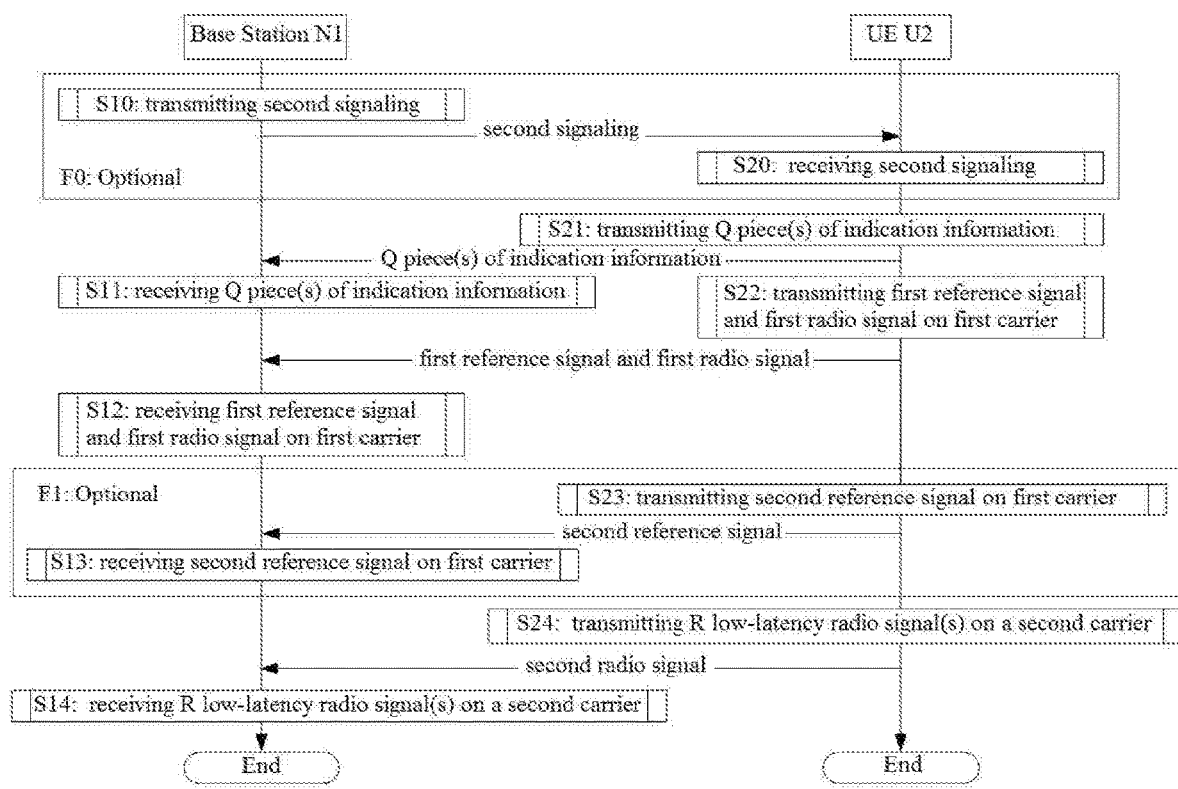
FIG. 1 is a flowchart of the transmission of a first radio signal according to one embodiment of the present disclosure.

Embodiment 1 illustrates an example of a flowchart of the transmission of a first radio signal according to the present disclosure, as shown in FIG. 1. In FIG. 1, a base station N1 is a maintenance base station for a serving cell of a UE U2. Steps in boxes marked by F0 and F1 are optional.

The base station N1 transmits a second signaling in S10, receives Q piece(s) of indication information in S11, receives a first reference signal and a first radio signal on a first carrier in S12, receives a second reference signal on the first carrier in S13, and receives R low-latency radio signal(s) on a second carrier in S14.

The UE U2 receives a second signaling in S20, transmits Q piece(s) of indication information in S21, transmits a first reference signal and a first radio signal on a first carrier in S22, transmits a second reference signal on the first carrier in S23, and transmits R low-latency radio signal(s) on a second carrier in S24.

In Embodiment 1, the first radio signal carries at least one of a first bit block and a first UCI. The first radio signal is transmitted by a first antenna port group. The first antenna port group includes P antenna port(s), P being a positive integer. The first reference signal includes P RS port(s), and the P RS port(s) is(are) transmitted by the P antenna port(s) respectively. The first radio signal includes L radio sub-signals, and the L radio sub-signals occupy L time intervals respectively, the L being a positive integer greater than 1. The Q piece(s) of indication information is(are) used for determining ratios of transmit powers of the first radio signal to transmit powers of the first reference signal in Q time interval(s) respectively. The Q time interval(s) is(are) one(Q ones) of the L time intervals. The Q is a positive integer less than or equal to the L. The second reference signal includes P RS port(s), time domain resources occupied by the first reference signal belong to a first time interval, time domain resources occupied by the second reference signal belong to a second time interval, and the first time interval and the second time interval are two orthogonal time intervals of the L time intervals. Time domain resources occupied by the R low-latency radio signal(s) belong to R time interval(s) respectively and the R time interval(s) is(are) one(R ones) of the L time intervals, the R being a positive integer. The low-latency radio signal carries at least one of a low-latency bit block and a low-latency UCI. Time domain resources occupied by R radio sub-signal(s) of the L radio sub-signals belong to the R time interval(s) respectively. A transmit power of a given radio sub-signal of the R radio sub-signal(s) is a first power. A time interval occupied by the given radio sub-signal is a given time interval, and the given time interval is one of the R time interval(s). Time domain resources occupied by a given low-latency radio signal of the R low-latency radio signal(s) belong to the given time interval. A transmit power of the given low-latency radio signal is a second power. The Q piece(s) of indication information is(are) all transmitted on the first carrier, and the Q piece(s) of indication information is(are) transmitted in the Q time interval(s) respectively. The second signaling is used for determining at least one of the Q time interval(s) and time-frequency resources occupied by the indication information in corresponding time intervals.

In one subembodiment, the first reference signal and the second reference signal are orthogonal in time domain.

In one subembodiment, the first reference signal occupies a positive integer number of multicarrier symbols in time domain.

In one subembodiment, the second reference signal occupies a positive integer number of multicarrier symbols in time domain.

In one subembodiment, the first reference signal occupies one multicarrier symbol in time domain.

In one subembodiment, the second reference signal occupies one multicarrier symbol in time domain.

In one subembodiment, frequency domain resources occupied by the Q piece(s) of indication information are fixed.

In one subembodiment, frequency domain resources occupied by the Q piece(s) of indication information are predefined.

In one subembodiment, the second signaling is a cell-specific Radio Resource Control (RRC) signaling.

In one subembodiment, the second signaling is a UE-specific RRC signaling.

In one subembodiment, the second signaling is a sTTI-specific RRC signaling.

In one subembodiment, the second signaling is a physical layer signaling.

Embodiment 2

Figure 2:
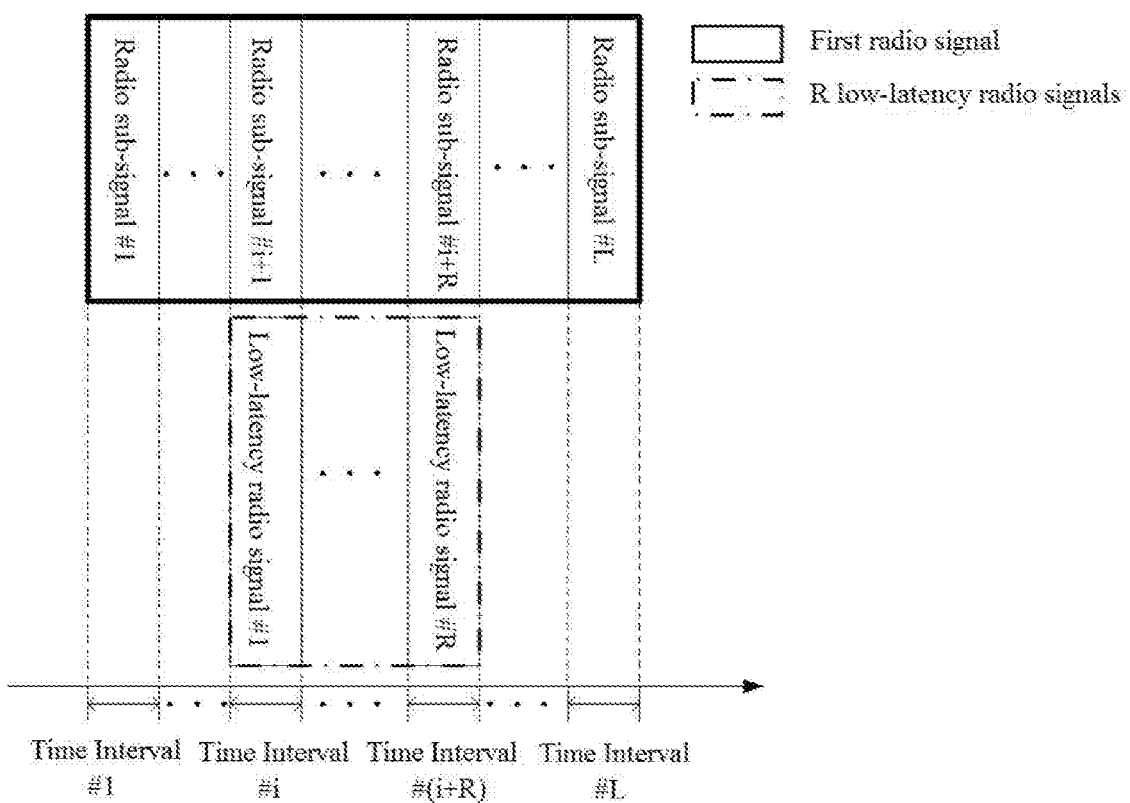
FIG. 2 is a diagram illustrating L radio sub-signals and R low-latency radio signal(s) according to one embodiment of the present disclosure.

Embodiment 2 illustrates an example of a diagram of L radio sub-signals and R low-latency radio signal(s) according to the present disclosure, as shown in FIG. 2. In FIG. 2, the first radio signal consists of L radio sub-signals, which correspond to a radio sub-signal #1 to a radio sub-signal #L respectively and occupy a time interval #1 to a time interval #L respectively. R consecutive radio sub-signal(s) among the L radio sub-signals is(are) overlapping with the R low-latency radio signal(s) in time domain. The R consecutive radio sub-signal(s) is(are) a radio sub-signal #(i+1) to a radio sub-signal #(i+R). Given indication information is used for determining a ratio of a transmit power of the first radio signal to a transmit power of the first reference signal in a given time interval. The given indication information is one of the Q piece(s) of indication information. The given time interval is one time interval of the Q time interval(s). The i is an integer not less than 0 but less than or equal to (L-R).

In one subembodiment, the L time intervals constitute 1 ms.

In one subembodiment, the L time intervals constitute a first sTTI, the R time interval(s) constitute(s) a second sTTI, and the duration of the first sTTI is not less than the duration of the second sTTI.

In one subembodiment, the duration of the sTTI in time domain is equal to the duration of T consecutive multicarrier symbol(s). The T is one of 1, 2, 4 and 7.

In one subembodiment, the first radio signal belongs to a first carrier, the low-latency radio signal belongs to a second carrier, the first carrier and the second carrier are orthogonal in frequency domain.

In one subembodiment, the i is equal to 0.

In one subembodiment, the (i+R) is equal to the L.

In one subembodiment, the Q is equal to the R.

Embodiment 3

Figure 3:
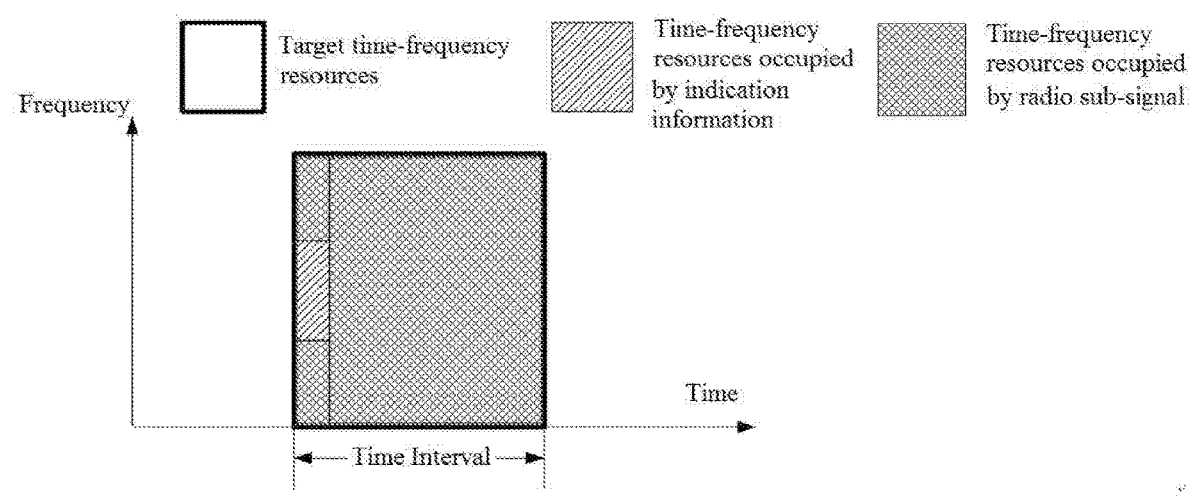
FIG. 3 is a diagram illustrating indication information according to one embodiment of the present disclosure.

Embodiment 3 illustrates an example of a diagram of indication information, as shown in FIG. 3. In FIG. 3, a bold line box represents target time-frequency resources, a box filled by slashes represents time-frequency resources occupied by one piece of indication information, and a box filled by cross lines represents time-frequency resources occupied by one radio sub-signal.

In Embodiment 3, the target time-frequency resources include the time-frequency resources occupied by the one piece of indication information and the time-frequency resources occupied by the one radio sub-signal.

In one subembodiment, the first radio signal is scheduled by a downlink signaling, time-frequency resources indicated by the downlink signaling include L time-frequency sub-resources, and the L radio sub-signals in the present disclosure are transmitted in the L time-frequency sub-resources respectively. The target time-frequency resources are one of the time-frequency sub-resources.

In one subembodiment, the radio sub-signal is punctured on the time-frequency resources occupied by the one piece of the indication information.

Embodiment 4

Figure 4:
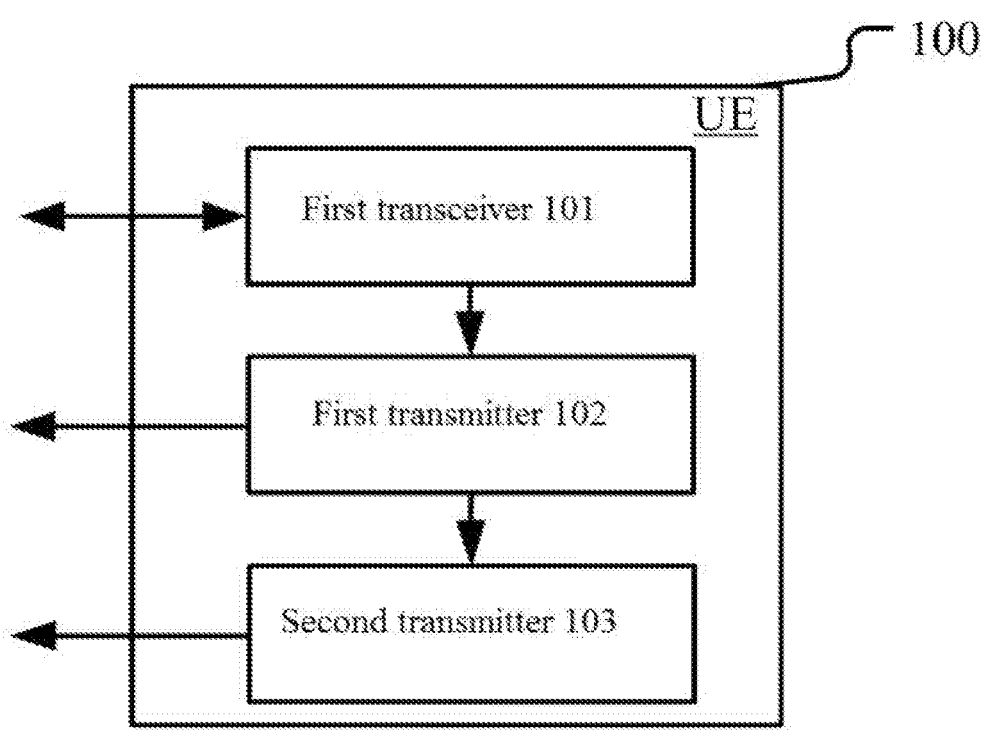
FIG. 4 is a structure block diagram illustrating a processing device in a UE according to one embodiment of the present disclosure.

Embodiment 4 illustrates an example of a structure block diagram of a processing device in a UE, as shown in FIG. 4. In FIG. 4, the processing device 100 in the UE includes a first transceiver 101, a first transmitter 102 and a second transmitter 103.

The first transceiver 101 transmits Q piece(s) of indication information.

The first transmitter 102 transmits a first reference signal and a first radio signal on a first carrier.

The second transmitter 103 transmits R low-latency radio signal(s) on a second carrier.

In Embodiment 4, the first radio signal carries at least one of a first bit block and a first UCI. The first radio signal is transmitted by a first antenna port group. The first antenna port group includes P antenna port(s), P being a positive integer. The first reference signal includes P RS port(s), and the P RS port(s) is(are) transmitted by the P antenna port(s) respectively. The first radio signal includes L radio sub-signals, and the L radio sub-signals occupy L time intervals respectively, the L being a positive integer greater than 1. The Q piece(s) of indication information is(are) used for determining ratios of transmit powers of the first radio signal to transmit powers of the first reference signal in Q time interval(s) respectively. The Q time interval(s) is(are) one(Q ones) of the L time intervals. The Q is a positive integer less than or equal to the L. Time domain resources occupied by the R low-latency radio signal(s) belong to R time interval(s) respectively, and the R time interval(s) is(are) one(R ones) of the L time intervals, the R being a positive integer. The low-latency radio signal carries at least one of a low-latency bit block and a low-latency UCI. Time domain resources occupied by R radio sub-signal(s) of the L radio sub-signals belong to the R time interval(s) respectively. A transmit power of a given radio sub-signal of the R radio sub-signal(s) is a first power. A time interval occupied by the given radio sub-signal is a given time interval, and the given time interval is one of the R time interval(s). Time domain resources occupied by a given low-latency radio signal of the R low-latency radio signal(s) belong to the given time interval. A transmit power of the given low-latency radio signal is a second power.

In one subembodiment, the first transceiver 101 further receives a second signaling: and the second signaling is used for determining at least one of the Q time interval(s) and time-frequency resources occupied by the indication information in corresponding time intervals.

In one subembodiment, the first transmitter 102 further transmits a second reference signal on the first carrier. The second reference signal includes P RS port(s), time domain resources occupied by the first reference signal belong to a first time interval, time domain resources occupied by the second reference signal belong to a second time interval, and the first time interval and the second time interval are two orthogonal time intervals of the L time intervals.

In one subembodiment, given indication information occupies a positive integer number of RUs in a given time interval. The given indication information is one of the Q piece(s) of indication information, and the given time interval is the time interval occupied by a given radio sub-signal. Herein, the given radio sub-signal is a radio sub-signal of which the first power is determined by the given indication information.

In one subembodiment, the first radio signal carries the first bit block in the first bit block and the first UCI, and the given low-latency radio signal carries the low-latency UCI. A first ideal power is less than or equal to a total residual power minus a second power, and the first power is equal to the first ideal power. The second power is a transmit power of the given low-latency radio signal when the power is not scaled, and the first ideal power is a transmit power of the given radio sub-signal when the power is not scaled. The total residual power refers to a maximum total transmit power minus a total allocated power, and the total allocated power refers to a total transmit power of the UE on other carriers than the first carrier and the second carrier in the given time interval.

In one subembodiment, the first radio signal carries the first UCI, the given low-latency radio signal carries the low-latency UCI, the first UCI is transmitted on a physical layer data channel, and the low-latency UCI is transmitted on a physical layer control channel. A first ideal power is less than or equal to a total residual power minus a second power, and the first power is equal to the first ideal power. The second power is a transmit power of the given low-latency radio signal when the power is not scaled, and the first ideal power is a transmit power of the given radio sub-signal when the power is not scaled. The total residual power refers to a maximum total transmit power minus a total allocated power, and the total allocated power refers to a total transmit power of the UE on other carriers than the first carrier and the second carrier in the given time interval.

In one subembodiment, the first radio signal carries the first bit block in the first bit block and the first UCI, and the given low-latency radio signal carries the low-latency UCI. A first ideal power is greater than a total residual power minus a second power, and the first power is less than or equal to the total residual power minus the second power. The second power is a transmit power of the given low-latency radio signal when the power is not scaled, and the first ideal power is a transmit power of the given radio sub-signal when the power is not scaled. The total residual power refers to a maximum total transmit power minus a total allocated power, and the total allocated power refers to a total transmit power of the UE on other carriers than the first carrier and the second carrier in the given time interval.

In one subembodiment, the first radio signal carries the first UCI, the given low-latency radio signal carries the low-latency UCI, the first UCI is transmitted on a physical layer data channel, and the low-latency UCI is transmitted on a physical layer control channel. A first ideal power is greater than a total residual power minus a second power, and the first power is less than or equal to the total residual power minus the second power. The second power is a transmit power of the given low-latency radio signal when the power is not scaled, and the first ideal power is a transmit power of the given radio sub-signal when the power is not scaled. The total residual power refers to a maximum total transmit power minus a total allocated power, and the total allocated power refers to a total transmit power of the UE on other carriers than the first carrier and the second carrier in the given time interval.

Embodiment 5

Figure 5:
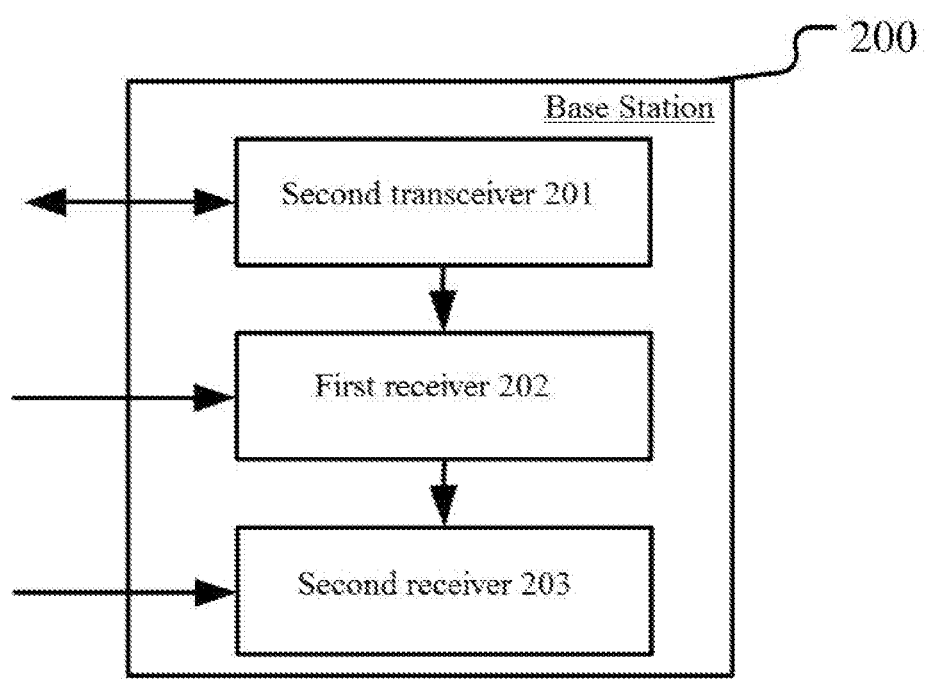
FIG. 5 is a structure block diagram illustrating a processing device in a base station according to one embodiment of the present disclosure.

Embodiment 5 illustrates an example of a structure block diagram of a processing device in a base station, as shown in FIG. 5. In FIG. 5, the processing device 200 in the base station includes a second transceiver 201, a first receiver 202 and a second receiver 203.

The second transceiver 201 receives Q piece(s) of indication information.

The first receiver 202 receives a first reference signal and a first radio signal on a first carrier.

The second receiver 203 receives R low-latency radio signal(s) on a second carrier.

In Embodiment, the first radio signal carries at least one of a first bit block and a first UCI. The first radio signal is transmitted by a first antenna port group. The first antenna port group includes P antenna port(s), P being a positive integer. The first reference signal includes P RS port(s), and the P RS port(s) is(are) transmitted by the P antenna port(s) respectively. The first radio signal includes L radio sub-signals, and the L radio sub-signals occupy L time intervals respectively, the L being a positive integer greater than 1. The Q piece(s) of indication information is(are) used for determining ratios of transmit powers of the first radio signal to transmit powers of the first reference signal in Q time interval(s) respectively. The Q time interval(s) is(are) one(Q ones) of the L time intervals. The Q is a positive integer less than or equal to the L. Time domain resources occupied by the R low-latency radio signal(s) belong to R time interval(s) respectively, and the R time interval(s) is(are) one(R ones) of the L time intervals, the R being a positive integer. The low-latency radio signal carries at least one of a low-latency bit block and a low-latency UCI. Time domain resources occupied by R radio sub-signal(s) of the L radio sub-signals belong to the R time interval(s) respectively. A transmit power of a given radio sub-signal of the R radio sub-signal(s) is a first power. A time interval occupied by the given radio sub-signal is a given time interval, and the given time interval is one of the R time interval(s). Time domain resources occupied by a given low-latency radio signal of the R low-latency radio signal(s) belong to the given time interval. A transmit power of the given low-latency radio signal is a second power.

In one subembodiment, the second transceiver 201 further transmits a second signaling. The second signaling is used for determining at least one of the Q time interval(s) and time-frequency resources occupied by the indication information in corresponding time intervals.

In one subembodiment, the first receiver 202 further receives a second reference signal on the first carrier. The second reference signal includes P RS port(s), time domain resources occupied by the first reference signal belong to a first time interval, time domain resources occupied by the second reference signal belong to a second time interval, and the first time interval and the second time interval are two orthogonal time intervals of the L time intervals.

In one subembodiment, given indication information occupies a positive integer number of RUs in a given time interval. The given indication information is one of the Q piece(s) of indication information, and the given time interval is the time interval occupied by a given radio sub-signal. Herein, the given radio sub-signal is a radio sub-signal of which the first power is determined by the given indication information.

In one subembodiment, the first radio signal carries the first UCI, and the given low-latency radio signal carries the low-latency bit block in the low-latency bit block and the low-latency UCI. A second ideal power is less than or equal to a total residual power minus a first power, and the second power is equal to the second ideal power. The first power is a transmit power of the given radio sub-signal when the power is not scaled, and the second ideal power is a transmit power of the given low-latency radio signal when the power is not scaled. The total residual power refers to a maximum total transmit power minus a total allocated power, and the total allocated power refers to a total transmit power of the UE on other carriers than the first carrier and the second carrier in the given time interval.

In one subembodiment, the first radio signal carries the first UCI, the given low-latency radio signal carries the low-latency UCI, the first UCI is transmitted on a physical layer control channel, and the low-latency UCI is transmitted on a physical layer data channel. A second ideal power is less than or equal to a total residual power minus a first power, and the second power is equal to the second ideal power. The first power is a transmit power of the given radio sub-signal when the power is not scaled, and the second ideal power is a transmit power of the given low-latency radio signal when the power is not scaled. The total residual power refers to a maximum total transmit power minus a total allocated power, and the total allocated power refers to a total transmit power of the UE on other carriers than the first carrier and the second carrier in the given time interval.

In one subembodiment, the first radio signal carries the first UCI, and the given low-latency radio signal carries the low-latency bit block in the low-latency bit block and the low-latency UCI. A second ideal power is greater than a total residual power minus a first power, and the second power is less than or equal to the total residual power minus the first power. The first power is a transmit power of the given radio sub-signal when the power is not scaled, and the second ideal power is a transmit power of the given low-latency radio signal when the power is not scaled. The total residual power refers to a maximum total transmit power minus a total allocated power, and the total allocated power refers to a total transmit power of the UE on other carriers than the first carrier and the second carrier in the given time interval.

In one subembodiment, the first radio signal carries the first UCI, the given low-latency radio signal carries the low-latency UCI, the first UCI is transmitted on a physical layer control channel, and the low-latency UCI is transmitted on a physical layer data channel. A second ideal power is greater than a total residual power minus a first power, and the second power is less than or equal to the total residual power minus the first power. The first power is a transmit power of the given radio sub-signal when the power is not scaled, and the second ideal power is a transmit power of the given low-latency radio signal when the power is not scaled. The total residual power refers to a maximum total transmit power minus a total allocated power, and the total allocated power refers to a total transmit power of the UE on other carriers than the first carrier and the second carrier in the given time interval.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to mobile phones, tablet computers, notebooks, vehicle-mounted communication equipment, wireless sensor, network cards, terminals for Internet of Things. REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base stations, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for low-latency communication, comprising:
transmitting Q piece(s) of indication information; and
transmitting a first reference signal and a first radio signal on a first carrier;
wherein the first radio signal carries at least one of a first bit block and first uplink control information; the first radio signal is transmitted by a first antenna port group; the first antenna port group comprises P antenna port(s), P being a positive integer; the first reference signal comprises P reference signal port(s), and the P reference signal port(s) is(are) transmitted by the P antenna port(s) respectively; the first radio signal comprises L radio sub-signals, and the L radio sub-signals occupy L time intervals respectively, the L being a positive integer greater than 1; the Q piece(s) of indication information is(are) used for determining ratios of transmit powers of the first radio signal to transmit powers of the first reference signal in Q time interval(s) respectively; the Q time interval(s) is(are) one(Q ones) of the L time intervals; and the Q is a positive integer less than or equal to the L.

2. The method according to claim 1, comprising:
transmitting a second reference signal on the first carrier;
wherein the second reference signal comprises P reference signal port(s), time domain resources occupied by the first reference signal belong to a first time interval, time domain resources occupied by the second reference signal belong to a second time interval, and the first time interval and the second time interval are two orthogonal time intervals of the L time intervals;
or, transmitting R low-latency radio signal(s) on a second carrier;
wherein time domain resources occupied by the R low-latency radio signal(s) belong to R time interval(s) respectively, and the R time interval(s) is(are) one(R ones) of the L time intervals, the R being a positive integer; the low-latency radio signal carries at least one of a low-latency bit block and low-latency uplink control information; time domain resources occupied by R radio sub-signal(s) of the L radio sub-signals belong to the R time interval(s) respectively; a transmit power of a given radio sub-signal of the R radio sub-signal(s) is a first power; a time interval occupied by the given radio sub-signal is a given time interval, and the given time interval is one of the R time interval(s); time domain resources occupied by a given low-latency radio signal of the R low-latency radio signal(s) belong to the given time interval; and a transmit power of the given low-latency radio signal is a second power;
or, the Q piece(s) of indication information is(are) all transmitted on the first carrier, and the Q piece(s) of indication information is(are) transmitted in the Q time interval(s) respectively;
or, receiving a second signaling;
wherein the second signaling is used for determining at least one of the Q time interval(s) and time-frequency resources occupied by the indication information in corresponding time intervals.

3. The method according to claim 2, wherein the first radio signal carries the first bit block in the first bit block and the first uplink control information, and the given low-latency radio signal carries the low-latency uplink control information; or the first radio signal carries the first uplink control information, the given low-latency radio signal carries the low-latency uplink control information, the first uplink control information is transmitted on a physical layer data channel, and the low-latency uplink control information is transmitted on a physical layer control channel; a first ideal power is less than or equal to a total residual power minus a second power, and the first power is equal to the first ideal power, or a first ideal power is greater than a total residual power minus a second power, and the first power is less than or equal to the total residual power minus the second power; the second power is a transmit power of the given low-latency radio signal when the power is not scaled, and the first ideal power is a transmit power of the given radio sub-signal when the power is not scaled; the total residual power refers to a maximum total transmit power minus a total allocated power, and the total allocated power refers to a total transmit power of the UE on other carriers than the first carrier and the second carrier in the given time interval.

4. The method according to claim 2, wherein the first radio signal carries the first uplink control information, and the given low-latency radio signal carries the low-latency bit block in the low-latency bit block and the low-latency uplink control information; or the first radio signal carries the first uplink control information, the given low-latency radio signal carries the low-latency uplink control information, the first uplink control information is transmitted on a physical layer control channel, and the low-latency uplink control information is transmitted on a physical layer data channel; a second ideal power is less than or equal to a total residual power minus a first power, and the second power is equal to the second ideal power; or a second ideal power is greater than a total residual power minus a first power, and the second power is less than or equal to the total residual power minus the first power; the first power is a transmit power of the given radio sub-signal when the power is not scaled, and the second ideal power is a transmit power of the given low-latency radio signal when the power is not scaled; the total residual power refers to a maximum total transmit power minus a total allocated power, and the total allocated power refers to a total transmit power of the UE on other carriers than the first carrier and the second carrier in the given time interval.

5. The method according to claim 2, wherein the first radio signal carries the first bit block in the first bit block and the first uplink control information, and the given low-latency radio signal carries the low-latency bit block in the low-latency bit block and the low-latency uplink control information; or the first radio signal carries the first uplink control information, the given low-latency radio signal carries the low-latency uplink control information, the first uplink control information is transmitted on a physical layer control channel, and the low-latency uplink control information is transmitted on a physical layer control channel; or the first radio signal carries the first uplink control information, the given low-latency radio signal carries the low-latency uplink control information, the first uplink control information is transmitted on a physical layer data channel, and the low-latency uplink control information is transmitted on a physical layer data channel; a sum of a first ideal power and a second ideal power is less than or equal to a total residual power, the first power is equal to the first ideal power, and the second power is equal to the second ideal power, or a sum of a first ideal power and a second ideal power is greater than a total residual power, the first power is equal to a product of the first ideal power and a scaling factor, and the second power is equal to a product of the second ideal power and the scaling factor; the first ideal power is a transmit power of the given radio sub-signal when the power is not scaled, and the second ideal power is a transmit power of the given low-latency radio signal when the power is not scaled; and the scaling factor is not less than 0 but less than or equal to 1.

6. A method in a base station for low-latency communication, comprising:
receiving Q piece(s) of indication information; and
receiving a first reference signal and a first radio signal on a first carrier;
wherein the first radio signal carries at least one of a first bit block and first uplink control information; the first radio signal is transmitted by a first antenna port group; the first antenna port group comprises P antenna port(s), P being a positive integer; the first reference signal comprises P reference signal port(s), and the P reference signal port(s) is(are) transmitted by the P antenna port(s) respectively; the first radio signal comprises L radio sub-signals, and the L radio sub-signals occupy L time intervals respectively, the L being a positive integer greater than 1; the Q piece(s) of indication information is(are) used for determining ratios of transmit powers of the first radio signal to transmit powers of the first reference signal in Q time interval(s) respectively; the Q time interval(s) is(are) one(Q ones) of the L time intervals; and the Q is a positive integer less than or equal to the L.

7. The method according to claim 6, comprising:
receiving a second reference signal on the first carrier;
wherein the second reference signal comprises P reference signal port(s), time domain resources occupied by the first reference signal belong to a first time interval, time domain resources occupied by the second reference signal belong to a second time interval, and the first time interval and the second time interval are two orthogonal time intervals of the L time intervals;
or, receiving R low-latency radio signal(s) on a second carrier;
wherein time domain resources occupied by the R low-latency radio signal(s) belong to R time interval(s) respectively, and the R time interval(s) is(are) one(R ones) of the L time intervals, the R being a positive integer; the low-latency radio signal carries at least one of a low-latency bit block and low-latency uplink control information; time domain resources occupied by R radio sub-signal(s) of the L radio sub-signals belong to the R time interval(s) respectively; a transmit power of a given radio sub-signal of the R radio sub-signal(s) is a first power; a time interval occupied by the given radio sub-signal is a given time interval, and the given time interval is one of the R time interval(s); time domain resources occupied by a given low-latency radio signal of the R low-latency radio signal(s) belong to the given time interval; and a transmit power of the given low-latency radio signal is a second power;
or, the Q piece(s) of indication information are all received on the first carrier, and the Q piece(s) of indication information is(are) transmitted in the Q time interval(s) respectively;
or, transmitting a second signaling;
wherein the second signaling is used for determining at least one of the Q time interval(s) and time-frequency resources occupied by the indication information in corresponding time intervals.

8. The method according to claim 7, wherein the first radio signal carries the first bit block in the first bit block and the first uplink control information, and the given low-latency radio signal carries the low-latency uplink control information; or the first radio signal carries the first uplink control information, the given low-latency radio signal carries the low-latency uplink control information, the first uplink control information is transmitted on a physical layer data channel, and the low-latency uplink control information is transmitted on a physical layer control channel; a first ideal power is less than or equal to a total residual power minus a second power, and the first power is equal to the first ideal power; or a first ideal power is greater than a total residual power minus a second power, and the first power is less than or equal to the total residual power minus the second power; the second power is a transmit power of the given low-latency radio signal when the power is not scaled, and the first ideal power is a transmit power of the given radio sub-signal when the power is not scaled; the total residual power refers to a maximum total transmit power minus a total allocated power, and the total allocated power refers to a total transmit power of the UE on other carriers than the first carrier and the second carrier in the given time interval.

9. The method according to claim 7, wherein the first radio signal carries the first uplink control information, and the given low-latency radio signal carries the low-latency bit block in the low-latency bit block and the low-latency uplink control information; or the first radio signal carries the first uplink control information, the given low-latency radio signal carries the low-latency uplink control information, the first uplink control information is transmitted on a physical layer control channel, and the low-latency uplink control information is transmitted on a physical layer data channel; a second ideal power is less than or equal to a total residual power minus a first power, and the second power is equal to the second ideal power; or a second ideal power is greater than a total residual power minus a first power, and the second power is less than or equal to the total residual power minus the first power; the first power is a transmit power of the given radio sub-signal when the power is not scaled, and the second ideal power is a transmit power of the given low-latency radio signal when the power is not scaled; the total residual power refers to a maximum total transmit power minus a total allocated power, and the total allocated power refers to a total transmit power of the UE on other carriers than the first carrier and the second carrier in the given time interval.

10. The method according to claim 7, wherein the first radio signal carries the first bit block in the first bit block and the first uplink control information, and the given low-latency radio signal carries the low-latency bit block in the low-latency bit block and the low-latency uplink control information; or the first radio signal carries the first uplink control information, the given low-latency radio signal carries the low-latency uplink control information, the first uplink control information is transmitted on a physical layer control channel, and the low-latency uplink control information is transmitted on a physical layer control channel; or the first radio signal carries the first uplink control information, the given low-latency radio signal carries the low-latency uplink control information, the first uplink control information is transmitted on a physical layer data channel, and the low-latency uplink control information is transmitted on a physical layer data channel; a sum of a first ideal power and a second ideal power is less than or equal to a total residual power, the first power is equal to the first ideal power, and the second power is equal to the second ideal power; or a sum of a first ideal power and a second ideal power is greater than a total residual power, the first power is equal to a product of the first ideal power and a scaling factor, and the second power is equal to a product of the second ideal power and the scaling factor; the first ideal power is a transmit power of the given radio sub-signal when the power is not scaled, and the second ideal power is a transmit power of the given low-latency radio signal when the power is not scaled; and the scaling factor is not less than 0 but less than or equal to 1.

11. A UE supporting low-latency communication, comprising:
a first transceiver, to transmit Q piece(s) of indication information;
a first transmitter, to transmit a first reference signal and a first radio signal on a first carrier; and
a second transmitter, to transmit R low-latency radio signal(s) on a second carrier;
wherein the first radio signal carries at least one of a first bit block and first uplink control information; the first radio signal is transmitted by a first antenna port group; the first antenna port group comprises P antenna port(s), P being a positive integer; the first reference signal comprises P reference signal port(s), and the P reference signal port(s) is(are) transmitted by the P antenna port(s) respectively; the first radio signal comprises L radio sub-signals, and the L radio sub-signals occupy L time intervals respectively, the L being a positive integer greater than 1; the Q piece(s) of indication information is(are) used for determining ratios of transmit powers of the first radio signal to transmit powers of the first reference signal in Q time interval(s) respectively; the Q time interval(s) is(are) one(Q ones) of the L time intervals; the Q is a positive integer less than or equal to the L; time domain resources occupied by the R low-latency radio signal(s) belong to R time interval(s) respectively, and the R time interval(s) is(are) one(R ones) of the L time intervals, the R being a positive integer; the low-latency radio signal carries at least one of a low-latency bit block and low-latency uplink control information; time domain resources occupied by R radio sub-signal(s) of the L radio sub-signals belong to the R time interval(s) respectively; a transmit power of a given radio sub-signal of the R radio sub-signal(s) is a first power; a time interval occupied by the given radio sub-signal is a given time interval, and the given time interval is one of the R time interval(s); time domain resources occupied by a given low-latency radio signal of the R low-latency radio signal(s) belong to the given time interval; and a transmit power of the given low-latency radio signal is a second power.

12. The UE according to claim 11, wherein
the first transmitter further transmits a second reference signal on the first carrier;
wherein the second reference signal comprises P reference signal port(s), time domain resources occupied by the first reference signal belong to a first time interval, time domain resources occupied by the second reference signal belong to a second time interval, and the first time interval and the second time interval are two orthogonal time intervals of the L time intervals;
or, the first transceiver further receives a second signaling;
wherein the second signaling is used for determining at least one of the Q time interval(s) and time-frequency resources occupied by the indication information in corresponding time intervals;

or, the Q piece(s) of indication information is(are) all transmitted on the first carrier, and the Q piece(s) of indication information is(are) transmitted in the Q time interval(s) respectively.

13. The UE according to claim 11, wherein the first radio signal carries the first bit block in the first bit block and the first uplink control information, and the given low-latency radio signal carries the low-latency uplink control information; or the first radio signal carries the first uplink control information, the given low-latency radio signal carries the low-latency uplink control information, the first uplink control information is transmitted on a physical layer data channel, and the low-latency uplink control information is transmitted on a physical layer control channel; a first ideal power is less than or equal to a total residual power minus a second power, and the first power is equal to the first ideal power; or a first ideal power is greater than a total residual power minus a second power, and the first power is less than or equal to the total residual power minus the second power; the second power is a transmit power of the given low-latency radio signal when the power is not scaled, and the first ideal power is a transmit power of the given radio sub-signal when the power is not scaled; the total residual power refers to a maximum total transmit power minus a total allocated power, and the total allocated power refers to a total transmit power of the UE on other carriers than the first carrier and the second carrier in the given time interval.

14. The UE according to claim 11, wherein the first radio signal carries the first uplink control information, and the given low-latency radio signal carries the low-latency bit block in the low-latency bit block and the low-latency uplink control information; or the first radio signal carries the first uplink control information, the given low-latency radio signal carries the low-latency uplink control information, the first uplink control information is transmitted on a physical layer control channel, and the low-latency uplink control information is transmitted on a physical layer data channel; a second ideal power is less than or equal to a total residual power minus a first power, and the second power is equal to the second ideal power; or a second ideal power is greater than a total residual power minus a first power, and the second power is less than or equal to the total residual power minus the first power; the first power is a transmit power of the given radio sub-signal when the power is not scaled, and the second ideal power is a transmit power of the given low-latency radio signal when the power is not scaled; the total residual power refers to a maximum total transmit power minus a total allocated power, and the total allocated power refers to a total transmit power of the UE on other carriers than the first carrier and the second carrier in the given time interval.

15. The UE according to claim 11, wherein the first radio signal carries the first bit block in the first bit block and the first uplink control information, and the given low-latency radio signal carries the low-latency bit block in the low-latency bit block and the low-latency uplink control information; or the first radio signal carries the first uplink control information, the given low-latency radio signal carries the low-latency uplink control information, the first uplink control information is transmitted on a physical layer control channel, and the low-latency uplink control information is transmitted on a physical layer control channel; or the first radio signal carries the first uplink control information, the given low-latency radio signal carries the low-latency uplink control information, the first uplink control information is transmitted on a physical layer data channel, and the low-latency uplink control information is transmitted on a physical layer data channel; a sum of a first ideal power and a second ideal power is less than or equal to a total residual power, the first power is equal to the first ideal power, and the second power is equal to the second ideal power; or a sum of a first ideal power and a second ideal power is greater than a total residual power, the first power is equal to a product of the first ideal power and a scaling factor, and the second power is equal to a product of the second ideal power and the scaling factor; the first ideal power is a transmit power of the given radio sub-signal when the power is not scaled, and the second ideal power is a transmit power of the given low-latency radio signal when the power is not scaled; and the scaling factor is not less than 0 but less than or equal to 1.

16. A base station supporting low-latency communication, comprising:
a second transceiver, to receive Q piece(s) of indication information;
a first receiver, to receive a first reference signal and a first radio signal on a first carrier; and
a second receiver, to receive R low-latency radio signal(s) on a second carrier;
wherein the first radio signal carries at least one of a first bit block and first uplink control information; the first radio signal is transmitted by a first antenna port group; the first antenna port group comprises P antenna port(s), P being a positive integer; the first reference signal comprises P reference signal port(s), and the P reference signal port(s) is(are) transmitted by the P antenna port(s) respectively; the first radio signal comprises L radio sub-signals, and the L radio sub-signals occupy L time intervals respectively, the L being a positive integer greater than 1; the Q piece(s) of indication information is(are) used for determining ratios of transmit powers of the first radio signal to transmit powers of the first reference signal in Q time interval(s) respectively; the Q time interval(s) is(are) one(Q ones) of the L time intervals; the Q is a positive integer less than or equal to the L; time domain resources occupied by the R low-latency radio signal(s) belong to R time interval(s) respectively, and the R time interval(s) is(are) one(R ones) of the L time intervals, the R being a positive integer; the low-latency radio signal carries at least one of a low-latency bit block and low-latency uplink control information; time domain resources occupied by R radio sub-signal(s) of the L radio sub-signals belong to the R time interval(s) respectively; a transmit power of a given radio sub-signal of the R radio sub-signal(s) is a first power; a time interval occupied by the given radio sub-signal is a given time interval, and the given time interval is one of the R time interval(s); time domain resources occupied by a given low-latency radio signal of the R low-latency radio signal(s) belong to the given time interval; and a transmit power of the given low-latency radio signal is a second power.

17. The base station according to claim 16, wherein
the first receiver receives a second reference signal on the first carrier;
wherein the second reference signal comprises P reference signal port(s), time domain resources occupied by the first reference signal belong to a first time interval, time domain resources occupied by the second reference signal belong to a second time interval, and the first time interval and the second time interval are two orthogonal time intervals of the L time intervals;

or, the Q piece(s) of indication information are all received on the first carrier, and the Q piece(s) of indication information is(are) transmitted in the Q time interval(s) respectively;

or, the second transceiver transmits a second signaling; wherein the second signaling is used for determining at least one of the Q time interval(s) and time-frequency resources occupied by the indication information in corresponding time intervals.

18. The base station according to claim 16, wherein the first radio signal carries the first bit block in the first bit block and the first uplink control information, and the given low-latency radio signal carries the low-latency uplink control information; or the first radio signal carries the first uplink control information, the given low-latency radio signal carries the low-latency uplink control information, the first uplink control information is transmitted on a physical layer data channel, and the low-latency uplink control information is transmitted on a physical layer control channel; a first ideal power is less than or equal to a total residual power minus a second power, and the first power is equal to the first ideal power; or a first ideal power is greater than a total residual power minus a second power, and the first power is less than or equal to the total residual power minus the second power; the second power is a transmit power of the given low-latency radio signal when the power is not scaled, and the first ideal power is a transmit power of the given radio sub-signal when the power is not scaled; the total residual power refers to a maximum total transmit power minus a total allocated power, and the total allocated power refers to a total transmit power of the UE on other carriers than the first carrier and the second carrier in the given time interval.

19. The base station according to claim 16, wherein the first radio signal carries the first uplink control information, and the given low-latency radio signal carries the low-latency bit block in the low-latency bit block and the low-latency uplink control information; or the first radio signal carries the first uplink control information, the given low-latency radio signal carries the low-latency uplink control information, the first uplink control information is transmitted on a physical layer control channel, and the low-latency uplink control information is transmitted on a physical layer data channel; a second ideal power is less than or equal to a total residual power minus a first power, and the second power is equal to the second ideal power; or a second ideal power is greater than a total residual power minus a first power, and the second power is less than or equal to the total residual power minus the first power; the first power is a transmit power of the given radio sub-signal when the power is not scaled, and the second ideal power is a transmit power of the given low-latency radio signal when the power is not scaled; the total residual power refers to a maximum total transmit power minus a total allocated power, and the total allocated power refers to a total transmit power of the UE on other carriers than the first carrier and the second carrier in the given time interval.

20. The base station according to claim 16, wherein the first radio signal carries the first bit block in the first bit block and the first uplink control information, and the given low-latency radio signal carries the low-latency bit block in the low-latency bit block and the low-latency uplink control information; or the first radio signal carries the first uplink control information, the given low-latency radio signal carries the low-latency uplink control information, the first uplink control information is transmitted on a physical layer control channel, and the low-latency uplink control information is transmitted on a physical layer control channel; or the first radio signal carries the first uplink control information, the given low-latency radio signal carries the low-latency uplink control information, the first uplink control information is transmitted on a physical layer data channel, and the low-latency uplink control information is transmitted on a physical layer data channel; a sum of a first ideal power and a second ideal power is less than or equal to a total residual power, the first power is equal to the first ideal power, and the second power is equal to the second ideal power; or a sum of a first ideal power and a second ideal power is greater than a total residual power, the first power is equal to a product of the first ideal power and a scaling factor, and the second power is equal to a product of the second ideal power and the scaling factor; the first ideal power is a transmit power of the given radio sub-signal when the power is not scaled, and the second ideal power is a transmit power of the given low-latency radio signal when the power is not scaled; and the scaling factor is not less than 0 but less than or equal to 1.

* * * * *